United States Patent
Jain et al.

(10) Patent No.: US 9,959,328 B2
(45) Date of Patent: May 1, 2018

(54) ANALYSIS OF USER TEXT

(71) Applicant: Microsoft Technology Licensing, LLC, Redmond, WA (US)

(72) Inventors: Navendu Jain, Seattle, WA (US); Rajeev Dubey, Sammamish, WA (US); Huy P. M. Dao, Redmond, WA (US); Adam J. Betz, Issaquah, WA (US); Jason M. Deakins, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 356 days.

(21) Appl. No.: 14/788,695

(22) Filed: Jun. 30, 2015

(65) Prior Publication Data
US 2017/0004184 A1   Jan. 5, 2017

(51) Int. Cl.
*G06F 7/00*    (2006.01)
*G06F 17/30*   (2006.01)
(Continued)

(52) U.S. Cl.
CPC .... *G06F 17/30554* (2013.01); *G06F 17/2735* (2013.01); *G06F 17/2775* (2013.01);
(Continued)

(58) Field of Classification Search
CPC ........... G06F 17/30554; G06F 17/2735; G06F 17/2775; G06F 17/2785; G06F 17/30386;
(Continued)

(56) References Cited

U.S. PATENT DOCUMENTS 4,816,994 A  3/1989 Freiling et al.
6,131,112 A  10/2000 Lewis et al.
(Continued)

FOREIGN PATENT DOCUMENTS

EP    1134727    9/2001

OTHER PUBLICATIONS

"Second Written Opinion Issued in PCT Application No. PCT/US2016/039466", dated Jun. 6, 2017, 7 Pages.
(Continued)

*Primary Examiner* — Azam Cheema
(74) *Attorney, Agent, or Firm* — Schwegman Lundberg & Woessner, P.A.

(57) ABSTRACT

Free-form text in a document can be analyzed using natural-language processing to determine actionable items specified by users in the text or to provide recommendations, e.g., by automatically analyzing texts from multiple users. Words or phrases of the text can be mapped to classes of a model. An actionable item can be determined using the mapped words or phrases that match a selected grammar pattern. Items can be ranked, e.g., based on frequency across multiple documents. In some examples, the classes can include a suggestion-indicator class or a modal-indicator class, and the selected grammar pattern can include one of those classes. In some examples, the mapping can use a dictionary. A new term not in the dictionary can be automatically associated with classes based on attributes of the new term and of terms in the dictionary, e.g., the new term's part of speech or neighboring terms.

17 Claims, 7 Drawing Sheets

(51) Int. Cl.
    *G06F 17/27* (2006.01)
    *G06Q 30/00* (2012.01)

(52) U.S. Cl.
    CPC .... *G06F 17/2785* (2013.01); *G06F 17/30386* (2013.01); *G06F 17/30684* (2013.01); *G06F 17/30705* (2013.01); *G06F 17/30914* (2013.01); *G06Q 30/00* (2013.01)

(58) Field of Classification Search
    CPC ......... G06F 17/30684; G06F 17/30705; G06F 17/30914; G06Q 30/00
    See application file for complete search history.

(56) References Cited

U.S. PATENT DOCUMENTS

| | | | |
|---|---|---|---|
| 6,742,141 | B1 | 5/2004 | Miller |
| 6,829,734 | B1 | 12/2004 | Kreulen et al. |
| 7,010,593 | B2 | 3/2006 | Raymond |
| 7,209,923 | B1 | 4/2007 | Cooper |
| 7,246,159 | B2 | 7/2007 | Aggarwal et al. |
| 7,853,544 | B2 | 12/2010 | Scott et al. |
| 7,995,485 | B1 | 8/2011 | Anderson et al. |
| 8,032,489 | B2 | 10/2011 | Villella et al. |
| 8,112,667 | B2 | 2/2012 | Belluomini et al. |
| 8,161,325 | B2 | 4/2012 | Calman et al. |
| 8,169,921 | B2 | 5/2012 | Yang et al. |
| 8,484,224 | B1* | 7/2013 | Harris ............ G06F 17/30041 707/723 |
| 8,515,828 | B1 | 8/2013 | Wolf et al. |
| 8,838,599 | B2 | 9/2014 | Xu et al. |
| 2002/0156817 | A1 | 10/2002 | Lemus |
| 2003/0172046 | A1 | 9/2003 | Scott |
| 2005/0138486 | A1 | 6/2005 | Gromyko |
| 2005/0154690 | A1 | 7/2005 | Nitta et al. |
| 2005/0171948 | A1 | 8/2005 | Knight |
| 2009/0055684 | A1 | 2/2009 | Jamjoom et al. |
| 2009/0063387 | A1 | 3/2009 | Beaty et al. |
| 2010/0049590 | A1 | 2/2010 | Anshul |
| 2011/0153539 | A1 | 6/2011 | Rojahn |
| 2011/0289076 | A1 | 11/2011 | Boyle et al. |
| 2011/0313962 | A1 | 12/2011 | Jones et al. |
| 2012/0245924 | A1 | 9/2012 | Brun |
| 2012/0290715 | A1 | 11/2012 | Dinger et al. |
| 2013/0110498 | A1* | 5/2013 | Bekkerman ......... G06F 17/2745 704/9 |
| 2013/0332145 | A1 | 12/2013 | Bostick et al. |
| 2014/0006861 | A1* | 1/2014 | Jain .................... G06Q 30/01 714/26 |
| 2015/0006519 | A1 | 1/2015 | Jain et al. |
| 2015/0178270 | A1 | 6/2015 | Zuev et al. |
| 2017/0004205 | A1 | 1/2017 | Jain et al. |

OTHER PUBLICATIONS

Marcus, et al., "Building a Large Annotated Corpus of English the Penn Treebank", Retrieved at <<http://delivery.acm.org/10.1145/980000/972475/p313-marcus.pdf>>, In Journal of Computational Linguistics—Special Issue on Using Large Corpora, vol. 19, Issue 2, Jun. 1993, pp. 18.

McCallum, et al., "Early Results for Named Entity Recognition with Conditional Random Fields, Feature Induction and Web-Enhanced Lexicons", Retrieved at <<http:l/people.cs.umass.edu/~mccallum/papers/mccallum-conll2003.pdf>>, In Proceedings of the Seventh Conference on Natural language learning at HLT-NAACL, vol. 4, May 31, 2003, pp. 4.

Medem, et al., "TroubleMiner: Mining Network Trouble Tickets", Retrieved at <<http://ieeexplore.ieee.org/stamp/stamp.jsp?tp=&amumber5195946>>, In IFIP/IEEE International Symposium on Integrated Network Management-Workshops, Jun. 1, 2009, pp. 7.

Melchiors, et al., "Troubleshooting Network Faults Using Past Experience", Retrieved at <<http://ieeexplore.ieee.org/stamp/stamp.jsp?amumber=00830413>>, In IEEE/IFIP Network Operations and Management Symposium, Apr. 10, 2000, pp. 14.

Mitra, et al., "Automatic Text Summarization by Paragraph Extraction", Retrieved at <<http://www.aclweb.org/anthology-new/W/W97/W97-0707.pdf>>, In Proceedings of the Workshop on Intelligent Scalable Summarization at the ACL/EACL Conference, Jul. 7, 1997, pp. 8.

Muehlen, et al., "Developing Web Services Choreography Standards the Case of REST vs. SOAP", Retrieved at <<http://citeseerx.ist.psu.edu/viewdoc/download?doi=10.1.1.80.94&rep=rep&type=pdf>>, In Journal of Decision Support Systems Special Issue, Jul. 2005, pp. 35.

"N-Gram Extraction Tools", retrieved at <<http://goo.gl/VNTJa>>, accessed on Oct. 31, 2012, 3 pages.

Nagao, et al., "A New Method of N-Gram Statistics for Large Number of Nand Automatic Extraction of Words and Phrases from Large Text Data of Japanese", Retrieved at <<http://delivery.acm.org/1 0.1145/1 000000/991994/p611-nagao.pdf>>, In COLING '94 Proceedings of the 15th Conference on Computational linguistics, vol. 1, Aug. 5, 1994, pp. 5.

Noy, et al., "Ontology Development 101: A Guide to Creating Your First Ontology.", Retrieved at <<http://protege.stanford.edu/publications/ontology_development/ontology101.pdf>>, In Technical Report of Stanford Knowledge Systems Laboratory and Stanford Medical Informatics, Mar. 2001, pp. 25.

Paolacci, et al., "Running Experiments on Amazon Mechanical Turk", Retrieved at <<http://repub.eur.nl/res/pub/31983/jdm10630a[1].pdf>>, In Judgment and Decision Making, vol. 5, No. 5, Aug. 2010, pp. 9.

Potharaju, et al., "Juggling the Jigsaw: Towards Automated Problem Inference from Network Trouble Tickets", In Proceedings of 10th USENIX Symposium on Networked Systems Design and Implementation, Apr. 2, 2013, pp. 127-141.

Qiu, et al., "What Happened in My Network Mining Network Events from Router Syslogs", Retrieved at <<http://conferences.sigcomm.org/imc/2010/papers/p472.pdf>>, In Proceedings of the 10th ACM SIGCOMM Conference on Internet Measurement, Nov. 1, 2010, pp. 13.

Raghavendra, et al., "No Power Struggles: Coordinated Multi-level Power Management for the Data Center", Retrieved at <<http://www.cs.pitt.edu/-kirklcs3150spring2010/2008_asplos_nopowerstruggles.pdf>>, In ACM SIGOPS Operating Systems Review, vol. 42, Issue 2, Mar. 1, 2008, pp. 12.

Roughan et al., "IP Forwarding Anomalies and Improving their Detection Using Multiple Data Sources", in the Proceedings of the ACM SIGCOMM Workshop on Network Troubleshooting: Research, Theory and Operations Practice Meet Malfunctioning Reality, Sep. 2004, 6 pages.

Seemakurty, et al., "Word Sense Disambiguation via Human Computation", Retrieved at <<http://www.cs.cmu.edu/~tomasic/doc/2010/SeemakurtyEtAIHCOMP2010.pdf>>, In Proceedings of the ACM SIGKDD Workshop on Human Computation, Jul. 25, 2010, pp. 4.

Shokripour, et al., "Automatic Bug Assignment Using Information Extraction Methods", In Proceedings of International Conference on Advanced Computer Science Applications and Technologies, Nov. 26, 2012, 6 pages.

Simm, et al., "Classification of Short Text Comments by Sentiment and Actionability for VoiceYourView", In Proceedings of IEEE International Conference on Social Computing / IEEE International Conference on Privacy, Security, Risk and Trust, Aug. 20, 2010, pp. 552-557.

Smadja, Frank., "Retrieving Collocations from Text: Xtract", Retrieved at <<http://acl.ldc.upenn.edu/J/J93/J93-1007.pdf>>, In Journal of Computational Linguistics—Special Issue on Using large Corpora, Mar. 1993, pp. 36.

Sorokin, et al., "Utility Data Annotation with Amazon Mechanical Turk", Retrieved at <<http://ieeexplore.ieee.org/stamp/stamp.jsptp=arnumber=4562953>>, In IEEE Computer Society Conference on Computer Vision and Pattern Recognition Workshops, Jun. 23, 2008, pp. 8.

(56) References Cited

OTHER PUBLICATIONS

Spasic et al., "Text mining and ontologies in biomedicine: Making sense of raw text", in the Journal of Briefing in Bioinformatics, vol. 6, No. 3, Sep. 2005, pp. 239-251.
"SQL Server", Retrieved at <<http://www.microsoft.com/sqlserver/en/us/default.aspx>>, Aug. 8, 2012, pp. 12.
Sukumaran, et al., "Integrating Structured and Unstructured Data Using Text Tagging and Annotation", In the Data Administration Newsletter, May 29, 2007, 6 pages.
Toutanova, et al., "Enriching the Knowledge Sources Used in a Maximum Entropy Part-of-Speech Tagger", Retrieved at <<http://nlp.stanford.edu/-manning/papers/emnlp2000.pdf>>, In Proceedings of the Joint SIGDAT Conference on Empirical Methods in Natural Language Processing and Very Large Corpora, Oct. 7, 2000, pp. 8.
Turner et al., "California Fault Lines: Understanding the Causes and Impact of Network Failures", in the Proceedings of the ACM SIGCOMM 2010 Conference, Aug. 2010, 12 pages.
Ukkonen, "On-line Construction of Suffix Trees", in the Journal of Algorithmica, vol. 14, Iss. 3, Sep. 1995, pp. 249-260.
Von Ahn, "Games with a Purpose", in the Journal of Computer, vol. 39, Iss. 6, Jun. 2006, pp. 92-94.
Von Ahn et al., "Labeling Images with a Computer Game", in the Proceedings of the SIGCHI Conference on Human Factors in Computing Systems, Apr. 2004, 20 pages.
Weight, "Allegiance: How Text Analytics Changes Everything", Retrieved on Apr. 15, 2015, Available at <<https://www.allegiance.com/documents/text_analytics.pdf>>, 6 pages.
Welch, "A Technique for High-Performance Data Compression", in the Journal of Computer, vol. 17, Iss. 6, Jun. 1984, 12 pages.
Wu et al., "Open Information Extraction using Wikipedia", in the Proceedings of the 48th Annual Meeting of the Association for Computational Linguistics, Jul. 2010, 10 pages.
Xu et al., "Detecting Large-Scale System Problems by Mining Console Logs", in the Proceedings of the ACM SIGOPS 22nd Symposium on Operating Systems Principles, Oct. 2009, 16 pages.
Yamamoto et al., "Using Suffix Arrays to Compute Term Frequency and Document Frequency for All Substrings in a Corpus", in the Journal of Computational Linguistics, vol. 27, Iss. 1, Mar. 2001, 30 pages.
Yamanishi, et al., "Dynamic Syslog Mining for Network Failure Monitoring" in the Proceedings of the 2005 Eleventh ACM SIGKDD International Conference on Knowledge Discovery in Data Mining, Aug. 2005, 10 pages.
Yuan et al., "SherLog: Error Diagnosis by Connecting Clues from Run-time Logs", in the Proceedings of the Fifteenth Edition of ASPLOS on Architectural Support for Programming Languages and Operating Systems, Mar. 2010, 12 pages.
Zhang et al., "Extraction of Chinese Compound Words—An Experimental Study on a Very Large Corpus", in the Proceedings of the Second Workshop on Chinese Language Processing: held in conjunction with the 38th Annual Meeting of the Association for Computational Linguistics, vol. 12, Oct. 2000, 8 pages.
Ziefle, "Effects of display resolution on visual performance", Human Factors, The Journal of the Human Factors and Ergonomics Society, vol. 40, No. 4, 1998, pp. 554-568.
PCT Search Report and Written Opinion for corresponding PCT International Application No. PCT/US2016/039466, dated Oct. 10, 2016, 12 pages.
PCT Search Report for PCT International Application No. PCT/US2016/039467, dated Oct. 10, 2016, 6 pages.
Aciar, Silvana, "Mining Context Information from Consumer's Reviews", In Proceedings of 2nd Workshop on Context-Aware Recommender Systems, Sep. 30, 2010, 5 pages.
Aguilera et al., "Performance Debugging for Distributed Systems of Black Boxes", in the Proceedings of the 19th ACM Symposium on Operating Systems Principles, Oct. 19, 2003, 16 pages.
Aho et al., "Efficient String Matching: an Aid to Bibliographic Search", in the Journal of the Communications of the ACM, vol. 18, Iss. 6, Jun. 1975, 8 pages.

Ahonen et al., "Applying Data Mining Techniques for Descriptive Phrase Extraction in Digital Document Collections", in the Proceedings of the 1998 IEEE International Forum on Research and Technology Advances in Digital Libraries, Apr. 1998, 10 pages.
"Attensity Text Analytics Software", in Attensity White Paper, Retrieved on: Apr. 15, 2015, 14 pages.
Barco, et al., "Automated Troubleshooting of Mobile Networks Using Bayesian Networks", Retrieved at <<http://www.lcc.uma.es/-eva/doc/materiales/barco.pdf>>, in the Proceedings of the IASTED International Conference Communication Systems and Networks, Sep. 9, 2002, pp. 6.
Barnes et al., "A Hierarchical O(N log N) Force-Calculation Algorithm", in the Journal of Nature, vol. 324, Iss. 4, Dec. 4, 1986.
Baysal, et al., "A Bug You Like: A Framework for Automated Assignment of Bugs", In IEEE 17th International Conference on Program Comprehension, May 17, 2013, 2 pages.
Behnel, S. et al., "Cython: C-Extensions for Python", retrieved at <<http://cython.com>>, published 2008, accessed Oct. 31, 2012, 3 pages.
Bhattacharya, et al., "Automated, Highly-Accurate, Bug Assignment Using Machine Learning and Tossing Graphs", In Journal of Systems and Software, vol. 85, Issue 10, Oct. 2012, 37 pages.
Bos, et al., "Cascading style sheets, level 2 revision 1 CSS 2.1 specification", W3C working draft, W3C, Jun. 2005, 220 pages.
Bostock et al., "D3: Data-Driven Documents", in the Journal of the IEEE Transactions on Visualization and Computer Graphics, vol. 17, Iss. 12, Dec. 2011, 9 pages.
Brauckhoff et al., "Anomaly Extraction in Backbone Networks using Association Rules", in the Journal of IEEE/ACM Transactions on Networking (TON), vol. 20, Iss. 6, Dec. 2012, 7 pages.
Bray et al., "Extensible Markup Language (XML)", World Wide Web Consortium Recommendation REC-xml-19980210, available at ><http://www.w3.org/TR/PR-xml-971208>>, retrieved on Aug. 16, 2012, 42 pages.
Church et al., "Word Association Norms, Mutual Information, and Lexicography", in the Proceedings o fthe 27th Annual Meeting on Association for Computational Linguistics, Jun. 26, 1989, 8 pages.
Cohen et al., "Capturing, Indexing, Clustering, and Retrieving System History", in the Proceedings of the 20th SCM Symposium on Operating Systems Principles, Oct. 2005, 14 pages.
Cooley et al., "Web Mining: Information and Pattern Discovery on the World Wide Web", in the Proceedings of the Ninth IEEE International Conference on Tools with Artificial Intelligence, Nov. 1997, 10 pages.
Deerwester et al., "Indexing by Latent Semantic Analysis", in the Journal of the American Society for Information Science, vol. 41, No. 6, Sep. 1990, 17 pages.
Ellram, et al., "Total Cost of Ownership a Key Concept in Strategic Cost Management Decisions", in the Journal of Business Logistics, vol. 19, No. 1, 1998, pp. 55-84.
"Enterprise Feedback Management", Published on: Jun. 30, 2012 Available at: <<http://www.forumresearch.com/services-enterprise-feedback-management.asp>>, 2 pages.
Fielding, "Architectural Styles and the Design of Network-based Software Architectures", Doctoral Dissertation, available at <<http://jpkc.fudan.edu.cn/picture/article/216/35/4b/22598d594e3d93239700ce79bce1/7ed3ec2a-03c2-49cb-8bf8-5a90ea42f523.pdf>>, Aug. 2012, 180 pages.
Ford et al., "Availability in Globally Distributed Storage Systems", in the Proceedings of the 9th USENIX Conference on Operating Systems Design and Implementation, Oct. 4, 2010, 14 pages.
Fruchterman, et al, "Graph drawing by force-directed placement", Software Practice and Experience, vol. 21. No. 11, Nov. 1991, pp. 1129-1164.
Garrett, "Ajax: A New Approach to Web Applications", retrieved on Aug. 16, 2012, available at <<http://scholar.googleusercontent.com/scholar?q=cache:DY1KmbMV5IMJ:scholar.google.com>>, 6 pages.
Gill et al., "Understanding Network Failures in Data Centers: Meaurement, Analysis, and Implications", in the Proceedings of the ACM SIGCOMM 2011 Conference, Aug. 15, 2011, 12 pages.
Goldstein et al., "Summarizing Text Documents: Sentence Selection and Evaluation Metrics", in the Proceedings of the 22nd Annual

(56) References Cited

OTHER PUBLICATIONS

International ACM SIGIR Conference on Research and Development in Information Retrieval, Aug. 1999, 8 pages.
Gruber, "Toward principles for the design of ontologies used for knowledge sharing", in the International Journal of Human-Computer Studies—Special issue: the Role of Formal Ontology in the Information Technology, vol. 43, Iss. 5-6, Nov./Dec. 1995.
Gruschke, "Integrated event management Event Correlation Using Dependency Graphs", in the Proceedings of the 9th IFIP/ IEEE International Workshop on Distributed Systems, Operations and Management, Oct. 1998, 12 pages.
Heim, "Anaphora and Semantic Interpretation: A Reinterpretation of Reinhart's Approach", MIT Working Papers in Linguistics 25, 1998; pp. 205-246.
Hickson, "A Vocabulary and Associated APIs for HTML and XHTML", Editor's Draft, available at: <<https://sonnycc.files.wordpress.com/2010/12/html5.pdf>>, 23 pages.
Huang, et al., "Diagnosing Network Disruptions with Network-Wide Analysis", Retrieved at <<http://www.cc.gatech.edu/-jx/reprints/metrics160.pdf>>, in the Proceedings of the ACM SIGMETRICS International Conference on Measurement and Modeling of Computer Systems, Jun. 12, 2007, pp. 12.
Johnson, "NOC Internal Integrated Trouble Ticket System Functional Specification Wishlist ("NOC TT Requirements")", Merit Network Inc., Jan. 1992, 13 pages.
Jonsson, et al., "Automated Bug Assignment: Ensemble-based Machine Learning in Large Scale Industrial Contexts", In Proceedings of Empirical Software Engineering, Retrieved on: Apr. 29, 2015, 52 pages.
"JQuery", available at <<http://jquery.com/>>, retrieved on Aug. 7, 2012, 1 page.
Justeson, et al., "Technical terminology: some linguistic properties and an algorithm for identification in text", Natural Language Engineering: vol. 1, No. 1, Mar. 1995, pp. 9-27.
Kandula, et al., "Detailed Diagnosis in Enterprise Networks", Retrieved at <<http://research.microsoft.com/pubs/80590/sigcomm09-395.pdf>>, in the Proceedings of the ACM SIGCOMM Conference on Data Communication, Aug. 17, 2009, pp. 12.
Kandula, et al., "What's Going On? Learning Communication Rules in Edge Networks", Retrieved at <<http://citeseerx.ist.psu.edu/viewdoc/download?doi=10.1.1.145.3918&rep=rep1&type=pdf>>, in the Proceedings of the ACM SIGCOMM Conference on Data Communication, Aug. 17, 2008, pp. 12.
Khanna et al., "Automated Rule-Based Diagnosis through a Distributed Monitor System", in the Journal of IEEE Transactions on Dependable and Secure Computing, vol. 4, Iss. 4, Oct. 2007, 14 pages.

Konig et al., "Reducing the Human Overhead in Text Categorization", in the Proceedings of the 12th ACM SIGKDD International Conference on Knowledge Discovery and Data Mining, Aug. 2006, 6 pages.
Labovitz et al., "Experimental Study of Internet Stability and Backbone Failures", in the Proceedings of the Twenty-Ninth Annual International Symposium on Fault-Tolerant Computing, Jun. 1999, 8 pages.
Lang, et al., "Enhancing Business Intelligence with Unstructured Data", in Proceedings of Conference on Database Systems in Business, Technology and Web, Mar. 2, 2009, pp. 469-485.
Law et al., "An Integrated Case-Based Reasoning Approach for Intelligent Help Desk Fault Management", in the Journal of Expert Systems with Applications, vol. 13, Iss. 4, Nov. 1997, pp. 265-274.
Lim et al., "A Log Mining Approach to Failure Analysis of Enterprise Telephony Systems", in the Proceedings of the 2008 IEEE International Conference on Dependable Systems and Networks with FTCS and DCC, Jun. 2008, pp. 398-403.
Loper, et al., "NLTK: The Natural Language Toolkit", Retrieved at <<http://arxiv.org/pdf/cs/0205028v1.pdf>>, In Proceedings of the Workshop on Effective Tools and Methodologies for Teaching Natural Language Processing and Computational Linguistics, May 17, 2002, pp. 8.
MacKay, "Information Theory, Inference, and Learning Algorithms", Cambridge University Press, Aug. 25, 2004.
Manber, et al., "Suffix arrays a New Method for on-Line String Searches", Retrieved at <<http://webglimpse.net/pubs/suffix.pdf>>, In Proceedings of the First Annual ACM-SIAM Symposium on Discrete Algorithms, Jan. 22, 1990, pp. 16.
Mani, et al., "The Tipster Summac Text Summarization Evaluation", Retrieved at <<http://acl.ldc.upenn.edu/E/E99/E99-1011.pdf>>, In Proceedings of the Ninth Conference on European Chapter of the Association for Computational Linguistics, Jun. 8, 1999, pp. 9.
Manning, et al., "Foundations of Statistical Natural Language Processing", Retrieved at <<http://cs.famaf.unc.edu.ar/laura/llibres/snlp.pdf>>, In Book of Foundations of Statistical Natural Language Processing, Jun. 18, 1999, 351 Pages. Part 2.
Manning, et al., "Foundations of Statistical Natural Language Processing", Retrieved at <<http://cs.famaf.unc.edu.ar/laura/llibres/snlp.pdf>>, In Book of Foundations of Statistical Natural Language Processing, Jun. 18, 1999, pp. 1-353. Part 1.
Manning, et al., "Introduction to Information Retrieval", Retrieved at <<http://www.math.unipd.it/~aiolli/corsi/0910/IR/irbookprint.pdf>>, In Book of Introduction to Information Retrieval, May 27, 2008, pp. 504.
"International Preliminary Report on Patentability Issued in PCT Application No. PCT/US2016/039466", dated Sep. 4, 2017, 8 Pages.

\* cited by examiner

DOCUMENT 300

302 — {1E0F17C0-16B7-11E5-BCC6-0002A5D5C51B}

304 —

| TEXT SECTION | "THE 'FULLSCREEN' BUTTON ON MODERN APPS SHOULD BE IN A DIFFERENT PLACE, SO THAT THE TRADITIONAL 'MINIMIZE,' 'MAXIMIZE/RESTORE,' AND 'CLOSE' BUTTONS APPEAR IN THE REGULAR ORDER." |

306 →

| | | | |
|---|---|---|---|
| Feedback Source: | UIF | Last Modified by: | |
| Created Date: | March 14, 2015 | Last Modified on: | |
| Created Time: | 9:26:53 AM | Survey Question ID: | 42 |
| Created by User: | JDoe | Survey Response: | 4 |
| Hardware type: | Tablet | Ambient light: | 250 lux |
| Hardware ID: | {e12615a0-1f37-11e5-b535-0002a5d5c51b} | | |

FIG. 3

ANALYSIS OF USER TEXT

BACKGROUND

Users often provide feedback regarding services, software elements, or hardware elements through various means. In some instances, the feedback relates to bugs or other issues with the software or hardware, while in other instances the feedback relates to asking questions or providing suggestions for improving the software or hardware. In yet further instances, the feedback includes text or other information, such as a general description about how the software or hardware works, a feature that a user likes or dislikes, information that is not related to the software or hardware, and so on. For example, a user might use a support interface provided by an operating system to let an administrator know about features that the user likes and problems that the user is having with a particular feature of the operating system. In many instances, the feedback is manually viewed and evaluated by administrators of the software or hardware to identify bugs or other issues with the software or hardware that need fixing. Since the feedback is manually evaluated, and often encompasses multiple different types of information (which may or may not be applicable to the administrators), the administrators spend considerable time analyzing the feedback.

SUMMARY

This disclosure describes systems, methods, and computer-readable media for analyzing free-form text, e.g., to determine user suggestions. In some instances, a document may be received that includes free-form text regarding feedback from a user. The document (e.g., text of the document) may be mapped to one or more classes of an ontology or other type of structured model. The mapped information of the ontology may be used to identify a suggestion in the document. For example, a word or phrase in the document may be tagged with a class that is identified from the ontology. A structure of the tagged document (e.g., a grammar pattern of tagged words or phrases) may be used to determine a suggestion for the document, such as a suggestion regarding an enhancement to hardware or software. Information regarding the suggestion may be made available to an individual for evaluation of the suggestion. In some aspects, a dictionary of term mappings can be automatically updated to include newly-received terms.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 shows an example document in accordance with some examples.

DETAILED DESCRIPTION

Overview

Figure 1:
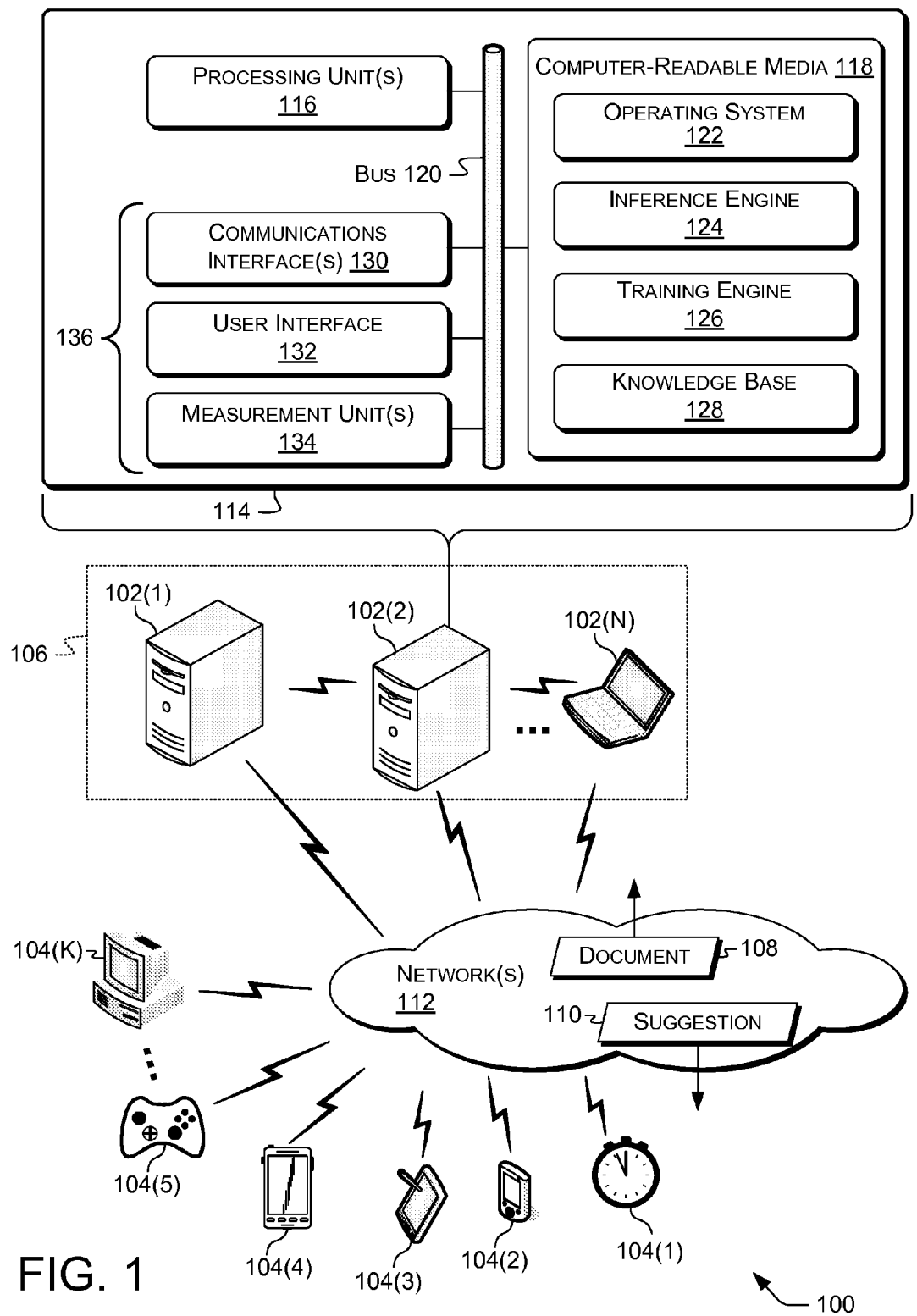
FIG. 1 is a block diagram depicting an example environment for implementing automated text analysis as described herein.

This document relates to analysis of data, and more particularly to performing automated inference of motifs expressed in documents. As used herein, a "motif" is a high-level category of a user statement, e.g., a suggestion, question, blocking issue or problem, or action statement. Various examples are directed to techniques and architectures for automatically processing user feedback to determine user suggestions. In many instances, the techniques and architectures can analyze one or more pieces of user feedback to identify suggestions and/or provide information about the suggestions to individuals for evaluation. Suggestions can relate to software, hardware, or another item or entity. In some examples, an administrator that manages a particular software element can be informed of a suggestion for an enhancement to the particular software element. Based on the information, the administrator may fix a problem with the software, implement a new feature, and/or perform a variety of other acts.

In some implementations of the techniques described herein, a service provider can collect one or more documents that include user feedback. The one or more documents can be collected from a variety of sources, such as an online source, a customer support portal, an electronic message, a conversation with a customer or intelligent personal assistant, and so on. The one or more documents can generally include at least some free-form text provided by a user (e.g., text in a natural language). Further, the one or more documents can include a variety of information which may or may not be relevant to a suggestion. For example, a document can include a sentence regarding a problem that a user is having with a software element, a sentence regarding a feature of the software element for which the user has indicated an interest (e.g., a feature the user likes), a sentence that is unrelated to the software element, and so on.

The service provider can analyze a document based on a knowledge base. Individual text segments (e.g., sentences, phrases, etc.) of the document can be tagged with classes of an ontology. Patterns of the classes can then be located in the tagged text segments to determine motifs such as "problem" or "suggestion." For example, a tagged text segment that matches a grammar pattern that is associated with a particular motif, e.g., a suggestion, can be identified as including the particular motif, e.g., the suggestion. In other words, the service provider can determine that the tagged text segment describes a problem, a suggestion, or other item that can be addressed by performing a task.

The service provider can make information available regarding suggestions found in the one or more documents. The information can be made available in a variety of manners to a variety of individuals. In some examples, a suggestion regarding a software entity can be provided to an individual that manages the software entity (e.g., sent in an email, provided via an interface, etc.). In another example, an individual can request suggestions for a particular entity, e.g., via a graphical interface. In yet another example, information regarding suggestions can include a ranking of the suggestions. For instance, if an individual requests to view top suggestions for an instant messaging application, the service provider can provide a ranking of suggestions that are identified for the instant messaging application across user feedback from multiple users.

In some instances, the techniques and architectures described herein can normalize user feedback. For example, by mapping user feedback to ontologies, the user feedback can be grouped according to various classes of words or phrases. This can increase consistency of words across various contexts. For example, a customer term for a problem with a software element can be mapped to a class that represents a technical term used by an administrator of the software element. Further, the techniques and architectures can analyze text in the form in which the text is presented (e.g., analyze a word or phrase based on surrounding words or phrases).

In many instances, the techniques and architectures are described herein in the context of suggestions for software or hardware. However, the techniques and architectures can be applicable to a wide variety of contexts, such as in a consumer context where feedback of consumer products is analyzed, a vehicle context where feedback of vehicles is analyzed, a consumable item context where feedback of consumable items is analyzed (e.g., food), a service context where feedback of a service is analyzed (e.g., restaurant service or another business service), and so on.

As used, the term "document" refers to a collection of one or more words, and includes both electronic and physical documents. In the context of an electronic document, the term can encompass the combination of human-language words along with metadata, e.g., as in the case of a word processing document or spreadsheet document. The term "feedback record" refers to a particular type of document that includes user feedback, e.g., solicited or unsolicited.

Some documents can include certain automated fields that are auto-filled by software that generates the documents, e.g., each field can be populated by the software with particular data values that relate to software being used or software generating the document. Documents can also include unstructured data, such as free-form text produced by humans communicating about the problem and/or logging messages generated by one or more devices. As discussed in more detail below, some example implementations can process this unstructured data to automatically infer various motifs, e.g., individual problems, actions, or suggestions inferred from an individual document and trends associated with the network failures inferred using multiple documents.

Some examples, scenarios, and examples of techniques for analysis of free-form user text in accordance with various examples are presented in greater detail in the description of the following figures.

Illustrative Environment

FIG. 1 shows an example environment 100 in which examples of full-text analysis systems can operate or in which inference analysis methods such as described below can be performed. In the illustrated example, various devices and/or components of environment 100 include computing devices 102(1)-102(N) (individually or collectively referred to herein with reference 102), where N is any integer greater than or equal to 1, and computing devices 104(1)-104(K) (individually or collectively referred to herein with reference 104), where K is any integer greater than or equal to 1. In some examples, N=K; in other examples, N>K or N<K. Although illustrated as, e.g., desktop computers, laptop computers, tablet computers, IoT sensors, or cellular phones, computing devices 102 or 104 can include a diverse variety of device categories, classes, or types and are not limited to a particular type of device.

In the illustrated example, computing devices 102(1)-102(N) can be computing nodes in a cluster 106, e.g., a cloud service such as MICROSOFT AZURE or IBM BLUEMIX. Cloud computing permits computing resources to be provided as services rather than a deliverable product. For example, in a cloud-computing environment, computing power, software, information, and/or network connectivity are provided (for example, through a rental agreement) over a network, such as the Internet. In the illustrated example, computing devices 104 can be clients of cluster 106 and can submit jobs to cluster 106 and/or receive job results from cluster 106. Computing devices 102(1)-102(N) in cluster 106 can, e.g., share resources, balance load, increase performance, or provide fail-over support or redundancy. In some examples, some of the computing devices 102 can be hosted by a cloud service and others hosted at a customer's site. Computing devices 104 can additionally or alternatively operate in a cluster or grouped configuration.

By way of example and not limitation, computing devices 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 102(N)), wearable computers such as smart watches or biometric or medical sensors, implanted computing devices such as biometric or medical sensors, or fixed sensors, such as IoT sensors, configured to monitor time, environmental conditions, vibration, motion, or other attributes of the world or structures or devices therein, e.g., bridges or dams (e.g., 104(1), represented graphically as a clock), computer navigation client computing devices, satellite-based navigation system devices including global positioning system (GPS) devices and other satellite-based navigation system devices (e.g., 104(2), represented graphically as a PDA), tablet computers or tablet hybrid computers (e.g., 104(3)), smartphones, mobile phones, mobile phone-tablet hybrid devices, or other telecommunication devices (e.g., 104(4)), portable or console-based gaming devices or other entertainment devices such as network-enabled televisions, set-top boxes, media players, cameras, or personal video recorders (PVRs) (e.g., 104(5), represented graphically as a gamepad), automotive computers such as vehicle control systems, vehicle security systems, or electronic keys for vehicles, personal data assistants (PDAs), desktop computers (e.g., 104(K)), or integrated components for inclusion in computing devices, appliances, or other computing devices configured to participate in or carry out root-cause determination as described herein, e.g., for software debugging or monitoring purposes.

In some examples, as indicated, computing devices, e.g., computing devices 102(1) and 102(2), can intercommunicate to participate in or carry out text analysis or inference as described herein.

Different devices or types of devices can have different uses for text analysis results. For example, devices generally used by individual users such as computing devices 104(2)-104(4) can present confirmation to the users that their suggestions have been received. Devices generally used by system administrators, such as computing device 104(K), can display detected suggestions or trends therein to persons responsible for entities relevant to the suggestions.

In some examples, users of computing devices 104 communicate with providers of, e.g., hardware of computing devices 102 or 104 or software running thereon, to provided user feedback or comments regarding the hardware or software. Such communications are referred to herein as documents 108 and can be transmitted, e.g., electronically from a computing device 104 to a computing device 102. Such transmissions can be directly from a user. Additionally or alternatively, a user can communicate feedback to, e.g., a customer-service agent using a computing device 104(K), and the agent can provide a corresponding document 108 to computing devices 102.

In some examples, documents 108 can include structured data populated by computing devices 102 or 104, unstructured data such as free-form user text written by individual users, e.g., feedback from a user in a natural language, automated messages logged by one or more computing devices 102 or 104, or combinations thereof. Examples of types of data in a document are discussed below with reference to FIG. 3. Users can provide documents 108, e.g., during the course of use of a hardware or software product or service, when such a product or service crashes or otherwise malfunctions, or upon request, e.g., from computing device 102 or 104 or a software program running thereon. Various examples of documents 108 are discussed herein, e.g., with reference to the MICROSOFT CORTANA speech-recognition and personal-assistant software. However, these examples are not limiting. For example, the APPLE SIRI personal-assistant software can also be used to provide documents 108.

In some examples, computing device(s) 102 analyze the received documents 108 to infer user meaning. For example, computing device(s) 102 can determine user suggestions 110 or recommendations regarding software or hardware based at least in part on the contents of one or more document(s) 108. An individual document 108 can correspond to one suggestion 110, e.g., "SIRI should do logging," or to multiple suggestions 110, e.g., "CORTANA should read my mind and should control the weather." Computing device(s) 102 can transmit information of the suggestions 110 to computing device(s) 104, e.g., to a computing device 104(K) such as a workstation, or other computing device 104 of a user that is associated with management of the software or hardware that is the subject of the suggestion 110, e.g., CORTANA or SIRI.

In some examples, computing devices 102 or 104 can communicate with each other or with other computing devices via one or more networks 112. For example, as indicated, computing devices 104 can transmit documents 108 to computing devices 102 and receive suggestions 110 from computing devices 102, via network(s) 112. In some examples, computing devices 102 or 104 can communicate with external devices via networks 112. For example, networks 112 can include public networks such as the Internet, private networks such as an institutional or personal intranet, cellular networks, or combinations of private and public networks. Networks 112 can also include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Networks 112 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, networks 112 can also include a number of devices that facilitate network communications or form a hardware infrastructure for the networks, such as switches, routers, gateways, access points, firewalls, base stations, repeaters, backbone devices, and the like. Networks 112 can also include devices that facilitate communications between computing devices 102 or 104 using bus protocols of various topologies, e.g., crossbar switches, INFINIBAND switches, or FIBRE CHANNEL switches or hubs.

Different networks have different characteristics, e.g., bandwidth, latency, accessibility (open, announced but secured, or not announced), or coverage area. Computing devices 104 can use networks 112 having appropriate characteristics in communicating documents 108, e.g., synchronously or asynchronously, to computing device(s) 102. The type of network 112 used for any given connection between, e.g., a computing device 104 and cluster 106 can be selected based on these characteristics and on the type of interaction. For example, a low-power, low-bandwidth network can be selected for IoT sensors, and a low-latency network can be selected for smartphones.

In some examples, networks 112 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX, or multiples or combinations thereof.

Still referring to the example of FIG. 1, details of an example computing device 102(2) are illustrated at inset 114. The details of example computing device 102(2) can be representative of others of computing devices 102 or 104. However, individual ones of the computing devices 102 or 104 can include additional or alternative hardware and/or software components. Computing device 102(2) can include one or more processing units 116 operably connected to one or more computer-readable media 118 such as via a bus 120, which in some instances can include one or more of a system bus, a data bus, an address bus, a Peripheral Component Interconnect (PCI) Express (PCIe) bus, a PCI bus, a Mini-PCI bus, and any variety of local, peripheral, or independent buses, or any combination thereof. In some examples, plural processing units 116 can exchange data through an internal interface bus (e.g., PCIe), rather than or in addition to network 112. While in this example the processing units 116 are described as residing on the computing device 102(2), the processing units 116 can also reside on different computing devices 102 or 104 in some examples. In some examples, at least two of the processing units 116 can reside on different computing devices 102 or 104. In such examples, multiple processing units 116 on the same computing device 102 or 104 can use an interface bus 120 of the computing device 102 or 104 to exchange data, while processing units 116 on different computing devices 102 or 104 can exchange data via networks 112.

Processing units 116 can be or include one or more single-core processors, multi-core processors, CPUs, GPUs, general-purpose graphics processing units (GPGPUs), or hardware logic components configured, e.g., via specialized programming from modules or APIs, to perform functions described herein. For example, and without limitation, illustrative types of hardware logic components that can be used in or as processing units 116 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 116 can represent a hybrid device, such as a device from ALTERA or XILINX that includes a CPU core embedded in an FPGA fabric. These or other hardware logic components can operate independently or, in some instances, can be driven by a CPU. In some examples, at least some of computing devices 102 or 104 can include a plurality of processing units 116 of multiple types. For example, the processing units 116 in computing device 102(2) can be a combination of one or more GPGPUs and one or more FPGAs. Different processing units 116 can have different execution models, e.g., as is the case for graphics processing units (GPUs) and central processing unit (CPUs). In some examples, processing units 116, computer-readable media 118, and modules or engines stored on computer-readable media 118 can together represent an ASIC, FPGA, or other logic device configured to carry out the functions of such modules or engines.

Computer-readable media described herein, e.g., computer-readable media 118, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 102 or 104.

In contrast to computer storage media, communication media can embody computer-readable instructions, data structures, program modules, or other data in a modulated data signal, such as a carrier wave, or other transmission mechanism. As defined herein, computer storage media does not include communication media.

In some examples, computer-readable media 118 can store instructions executable by the processing units 116 that, as discussed above, can represent a processing unit incorporated in computing device 102. Computer-readable media 118 can additionally or alternatively store instructions executable by external processing units such as by an external CPU or external processor of any type discussed above. In some examples at least one processing unit 116, e.g., a CPU, GPU, or hardware logic device, is incorporated in computing device 102, while in some examples at least one processing unit 116, e.g., one or more of a CPU, GPU, or hardware logic device, is external to computing device 102.

Computer-readable media 118 can store, for example, executable instructions of an operating system 122, an inference engine 124, a training engine 126, and other modules, programs, or applications that are loadable and executable by processing units 116. Computer-readable media can also store, for example, a knowledge base 128. In some examples not shown, one or more of the processing units 116 in one of the computing devices 102 or 104 can be operably connected to computer-readable media 118 in a different one of the computing devices 102 or 104, e.g., via communications interface 130 and network 112. For example, program code to perform steps of flow diagrams herein can be downloaded from a server, e.g., computing device 102(1), to a client, e.g., computing device 104(K), e.g., via the network 112, and executed by one or more processing units 116 in computing device 104(K). For example, the computer-executable instructions stored on the computer-readable media 118 can upon execution configure a computer such as a computing device 102 or 104 to perform operations described herein with reference to the operating system 122, the inference engine 124, the training engine 126, or the knowledge base 128.

In some examples, the inference engine 124 can be configured to process document(s) 108 to infer various motifs (e.g., user text corresponding to those motifs, and likewise throughout) from the documents 108. For example, the inference engine 124 can identify motifs such as problems, actions, questions, or suggestions 110 expressed in the documents 108. For example, documents 108 expressing or containing suggestion motifs can include words or phrases that describe request(s) for new behavior(s) of an entity or changes to existing behavior(s) of an entity (e.g., add keyboard shortcuts, remove animations). The inference engine 124 can also identify trends over multiple documents 108 such as suggestions associated with a particular model of device or a particular device configuration. The inference engine 124 can process the documents 108 using information stored in the knowledge base 128, as discussed in more detail below.

In some examples, one or more computing device(s) 104 can include inference engine interface(s) (not shown) configured to communicate with, or receive results determined by, inference engine 124. For example, the inference engine interface can include a browser that receives and displays visualizations reflecting the inferences made by the inference engine 124, and a computing device 104 can display the visualizations to a user of computing device 104. Thus, computing device 104 can be used by a design engineer or manager to help analyze user suggestions 110 and, e.g., set development priorities accordingly. The inference engine interface can also be configured to operate on other, e.g., non-visual, forms of output by querying the inference engine 124 using one or more application programming interfaces to obtain output from the inference engine 124.

Computer-readable media 118 of the computing device 102 can store an operating system 122. In some examples, operating system 122 is not used (commonly referred to as a "bare metal" configuration). In some examples, operating system 122 can include components that enable or direct the computing device 102 to receive data via various inputs (e.g., user controls, network or communications interfaces, memory devices, or sensors), and process the data using the processing units 116 to generate output. The operating system 122 can further include one or more components that present the output (e.g., display an image on an electronic display, store data in memory, transmit data to another computing device, etc.). The operating system 122 can enable a user to interact with apps or with modules of the analysis engine 126 using a user interface 132. Additionally, the operating system 122 can include components that perform various functions generally associated with an operating system, e.g., storage management and internal-device management.

Computing device 102 can also include one or more communications interfaces 130 to enable wired or wireless communications between computing devices 102 or 104 and other networked computing devices 102 or 104 involved in root-cause determination or running apps, or other computing devices, over networks 112. Such communications interfaces 130 can include one or more transceiver devices, e.g., network interface controllers (NICs) such as Ethernet NICs or other types of transceiver devices, to send and receive communications over a network. The processing units 116 can exchange data through respective communications interfaces 130. In some examples, the communications interface 130 can be a PCIe transceiver, and the network 112 can be a PCIe bus. In some examples, the communications interface 130 can include, but is not limited to, a transceiver for cellular (3G, 4G, or other), WI-FI, Ultra-wideband (UWB), BLUETOOTH, or satellite transmissions. The communications interface 130 can include a wired I/O interface, such as an Ethernet interface, a serial interface, a Universal Serial Bus (USB) interface, an INFINIBAND interface, or other wired interfaces. For simplicity, these and other components are omitted from the illustrated computing device 102.

In some examples, computing device 102 or 104 can include user interface 132. User interface 132 can include one or more output devices configured for communication to a user or to another computing device 102 or 104. Output devices can be integral or peripheral to computing device 102 or 104. Examples of output devices can include a display, a printer, audio speakers, beepers, or other audio output devices, a vibration motor, linear vibrator, or other haptic output device, and the like.

User interface 132 can include one or more input devices, integral or peripheral to computing device 102 or 104. The input devices can be user-operable, or can be configured for input from other computing device 102 or 104. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device, a gestural input device such as a touchscreen, a grip sensor, an accelerometer, another haptic input, a visual input device such as one or more cameras or image sensors, and the like.

In some examples, computing device 102 or 104 can include one or more measurement units 134. Measurement units 134 can detect physical properties or status of computing device 102 or its environment. Examples of measurement units 134 can include units to detect motion, temperature, pressure, light, sound, electromagnetic radiation (e.g., for wireless networking), or any other detectable form of energy or matter in or within sensing range of computing device 102 or 104. Information from measurement units 134 on computing devices 104 can be incorporated, automatically or at user direction, into document(s) 108.

In some examples, e.g., of a smartphone computing device 104(4), measurement units 134 can include an accelerometer, a microphone, or front- and rear-facing cameras. Examples of measurement units 134 can include devices for measuring physical properties, devices for communicating, or devices for receiving information. In some examples, measurement units 134 can include a network transceiver (e.g., communications interface 130), a motion sensor, a proximity detector (e.g., for nearby life forms, people, or devices), a light sensor (e.g., a CdS photoresistor or a phototransistor), a still imager (e.g., a charge-coupled device, CCD, or complementary metal-oxide-semiconductor, CMOS, sensor), a video imager (e.g., CCD or CMOS), a microphone, a fingerprint reader, a retinal scanner, an iris scanner, or a touchscreen (e.g., in or associated with a display in user interface 132 such as display 210, FIG. 2).

In some examples, computing device 102 or 104 can include one or more sensors 136. Components of communications interface 130, e.g., transceivers for BLUETOOTH, WI-FI, or LTE, can be examples of sensors 136. Such components can be used to, e.g., detect signals corresponding to characteristics of accessible networks. Such signals can also be detected by automatically locating information in a table of network information (e.g., cell-phone tower locations), or by a combination of detection by component of communications interface 130 and table lookup. Components of user interface 132, e.g., touchscreens or phone mouthpieces, can also be examples of sensors 136. Measurement units 134 can also be examples of sensors 136. In some examples, a particular device can simultaneously or selectively operate as part of two or more of communications interface 130, user interface 132, and one or more measurement units 134. For example, a touchscreen can be an element of user interface 132 and used to present information and receive user commands. Signals from the same touchscreen can also be used in determining a user's grip on computing device 102 or 104. Accordingly, that touchscreen in this example is also a sensor 136. Information from measurement units 134 on computing devices 104 can be incorporated, automatically or at user direction, into document(s) 108.

Illustrative Components

Figure 2:
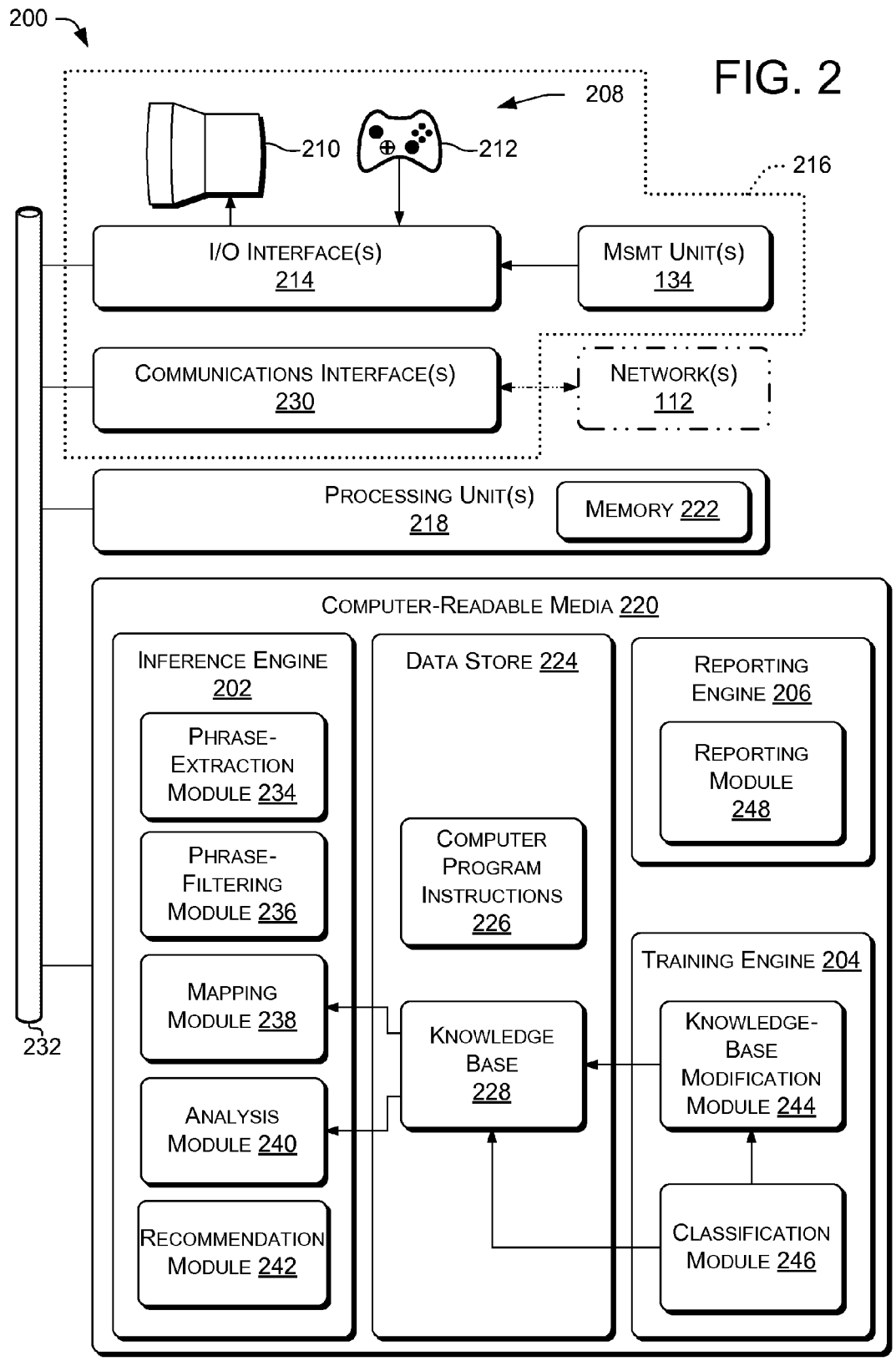
FIG. 2 is a block diagram depicting an example computing device configured to participate in automated text analysis according to various examples described herein.

FIG. 2 is an illustrative diagram that shows example components of a computing device 200, which can represent computing devices 102 or 104, and which can be configured to participate in inference analysis, according to various examples described herein. Computing device 200 can implement an inference engine 202, which can represent inference engine 124, FIG. 1. Computing device 200 can implement a training engine 204, which can represent training engine 126, FIG. 1. Computing device 200 can implement a reporting engine 206.

In some examples, e.g., of a computing device 102 providing an inference-analysis or suggestion-analysis service, the computing device 200 can implement inference engine 202 and training engine 204 but not reporting engine 206. In some examples, e.g., of a computing device 104 making use of an inference service, the computing device 200 can implement reporting engine 206 but not training engine 204. In some examples, e.g., of a computing device 102 or 104 implementing both an inference service and the use thereof, the computing device 200 can implement inference engine 202, training engine 204, and reporting engine 206.

Computing device 200 can include or be connected to a user interface 208, which can represent user interface 132. User interface 208 can include a display 210. Display 210 can include an organic light-emitting-diode (OLED) display, a liquid-crystal display (LCD), a cathode-ray tube (CRT), or another type of visual display. Display 210 can be a component of a touchscreen, or can include a touchscreen. User interface 208 can include various types of output devices described above with reference to user interface 132. In some examples, the reporting engine 206 is operatively coupled to the display 210 or another output device.

User interface 208 can include a user-operable input device 212 (graphically represented as a gamepad). User-operable input device 212 can include various types of input devices described above with reference to user interface 132.

Computing device 200 can further include one or more input/output (I/O) interfaces 214 by which computing device 200 can communicate with input, output, or I/O devices (for clarity, some not depicted). Examples of such devices can include components of user interface 208 such as user-operable input devices and output devices described above with reference to user interface 132. Other examples of such devices can include power meters, temperature sensors, and other devices for measuring properties of computing device 200 or its environment or of another computing device 102 or 104 or an environment thereof. Computing device 200 can communicate via I/O interface 214 with suitable devices or using suitable electronic/software interaction methods. Input data, e.g., of user inputs on user-operable input device 212, can be received via I/O interfaces 214, and output data, e.g., of user interface screens, can be provided via I/O interfaces 214 to display 210, e.g., for viewing by a user.

The computing device 200 can include one or more sensors 216, which can represent measurement units 134 or other sensors 136, as described above with reference to FIG. 1. Sensors 216 can also include components of user interface 208. In some examples, the user interface 208 can include at least one of the sensors 216. For example, the user interface 208 can include a touchscreen that includes a sensor 216. Individual ones of the sensors 216 can be configured to output sensor data corresponding to at least one physical property, e.g., a physical property of the device, such as acceleration, or of an environment of the device, such as temperature or humidity.

The computing device 200 can include one or more processing units 218, which can represent processing units 116. Processing units 218 can be operably coupled, e.g., via the I/O interface 214, to the user interface 208 and/or the sensors 216. Processing units 218 can be operably coupled to at least one computer-readable media 220, discussed below. Processing units 218 can include, e.g., processing unit types described above such as CPU- or GPGPU-type processing units. In some examples, processing units 218 can include or be connected to a memory 222, e.g., a random-access memory (RAM) or cache.

The processing units 218 can be configured to execute modules of the plurality of modules. For example, the computer-executable instructions stored on the computer-readable media 220 can upon execution configure a computer such as a computing device 200 to perform acts or operations described herein with reference to the modules of the plurality of modules, e.g., modules of the inference engine 202, training engine 204, and/or reporting engine 206. The modules stored in the computer-readable media 220 can include instructions that, when executed by the one or more processing units 218, cause the one or more processing units 218 to perform acts or operations described herein with reference to the modules of the plurality of modules, e.g., modules of the inference engine 202, training engine 204, and/or reporting engine 206. Examples of modules in computer-readable media 220 are discussed below. Computer-readable media 220 can also include an operating system, e.g., operating system 122.

In the illustrated example, computer-readable media 220 includes a data store 224. In some examples, data store 224 can include data storage, structured or unstructured, such as a database (e.g., a Structured Query Language, SQL, or NoSQL database) or data warehouse. In some examples, data store 224 can include a corpus or a relational database with one or more tables, arrays, indices, stored procedures, and so forth to enable data access. Data store 224 can store data for the operations of processes, applications, components, or modules stored in computer-readable media 220 or computer instructions in those modules executed by processing units 218. In some examples, the data store can store computer program instructions 226 (e.g., instructions corresponding to apps, to processes described herein, or to other software executable by processing units 218). In some examples, the data store 224 can store a knowledge base 228 which can represent knowledge base 128, FIG. 1.

The computing device 200 can also include a communications interface 230, which can represent communications interface 130. For example, communications interface 230 can include a transceiver device such as a network interface controller (NIC) to send and receive communications over a network 112 (shown in phantom), e.g., as discussed above. As such, the computing device 200 can have network capabilities. For example, the computing device 200 can exchange data with computing devices 102 or 104 (e.g., laptops, computers, and/or servers) via one or more networks 112, such as the Internet. As discussed above, sensors 216 can include components of communications interface 230.

In some examples, the processing units 218 can access the modules on the computer-readable media 220 via a bus 232, which can represent bus 120, FIG. 1. I/O interface 214 and communications interface 230 can also communicate with processing units 218 via bus 232.

The modules of the inference engine 202 stored on computer-readable media 220 can include one or more modules, e.g., shell modules, or application programming interface (API) modules, which are illustrated as a phrase-extraction module 234, a phrase-filtering module 236, a mapping module 238, an analysis module 240, and a recommendation module 242.

The modules of the training engine 204 stored on computer-readable media 220 can include one or more modules, e.g., shell modules, or application programming interface (API) modules, which are illustrated as a knowledge-base modification module 244 and a classification module 246.

The modules of the reporting engine 206 stored on computer-readable media 220 can include one or more modules, e.g., shell modules, or application programming interface (API) modules, which are illustrated as a reporting module 248.

In the inference engine 202, training engine 204, or reporting engine 206, the number of modules can vary higher or lower, and modules of various types can be used in various combinations. For example, functionality described associated with the illustrated modules can be combined to be performed by a fewer number of modules or APIs or can be split and performed by a larger number of modules or APIs. In some examples, the phrase-extraction module 234 and the phrase-filtering module 236; the phrase-extraction module 234, the phrase-filtering module 236, and the mapping module 238; the phrase-extraction module 234, the phrase-filtering module 236, the mapping module 238, and the analysis module 240; the recommendation module 242 and the reporting module 248; the phrase-extraction module 234, the phrase-filtering module 236, the mapping module 238, the analysis module 240, the recommendation module 242, and the reporting module 248; or the knowledge-base modification module 244 and the classification module 246 can be combined in a single module that performs at least some of the example functions described below of those modules. Such a combined module can be shared by or accessible to one or more of the inference engine 202, the training engine 204, and the reporting engine 206. In some examples, computer-readable media 220 can include a subset of modules 234, 236, 238, 240, 242, 244, 246, or 248.

FIG. 3 shows an example document 300 that can represent document 108, FIG. 1, and that can be obtained by inference engine 202, e.g., from a user's computing device 104. A document 300 can be a physical or electronic document having any type of content including text (e.g., structured or unstructured (free-form)), images, audio, and so on. In some examples, document 300 can include one or more of the following: text from electronic messages such as emails; user feedback collected by an operating system (OS) or OS component, e.g., through feedback dialogs in MICROSOFT WINDOWS or OS X; text from blog articles, social networking sites, websites, online product reviews, or other online communications or magazine articles; blog comments; responses to questionnaires, surveys, or review forms; whole or partial transcripts, or agent notes, of conversations between users and customer-service agents or between users and intelligent software personal assistants; text from instant messages such as via the Short Message Service (SMS) or AOL INSTANT MESSENGER (AIM); text from instant-messaging (IM) logs; user-initiated feedback (UIF) collected by systems such as WINDOWS 10, APPLE OS X, etc.; user comments provided in trouble documents or crash reports; or text provided via customer support portals, e.g., online portals, such as those included in or associated with MICROSOFT OFFICE 365, MICROSOFT AZURE, GOOGLE DOCS, or other tools.

The illustrated document 300 includes various sections relating to a particular problem in the data center. For example, document 300 includes a document number section 302 that includes an identifier (e.g., a unique identifier such as a globally-unique identifier, GUID) of the document 300. Document text section 304 includes free-form user text, e.g., feedback from a user in a natural language. Document data section 306 includes various data fields pertinent to the document 300. In the illustrated example, document 300 was submitted by user "JDoe" through the MICROSOFT WINDOWS User Initiated Feedback (UIF) system on Mar. 14, 2015 at 9:26:53 AM. The document 300 has not been modified since, as indicated by the blank "Last Modified by" and "Last Modified on" fields. In this example, the UIF system prompted the user to answer a survey question in addition to providing the user text in the document text section 304. The survey question asked had identification (ID) #42 in a survey question database, and the user's response to the survey question was "4" (e.g., on a scale of 1 to 5).

In some examples, document data section 306 includes a "hardware type" representing the type of computing device 102 or 104 the user was using at the time the document 300 was created. In the illustrated example, the shown document 300 was created by a user using a tablet computer. In some examples, document data section 306 includes a unique identification value ("Hardware ID") of the computing device 102 or 104 the user was using at the time the document 300 was created, e.g., a GUID. In some examples, document data section 306 includes data from one or more sensors 136 of the computing device 102 or 104 the user was using at the time the document 300 was created. In the illustrated example, the shown document 300 was created by a user in a space with an ambient light level measured at the tablet of 250 lux. In some examples, the document data section 306 can include any number or type of fields providing information about the computing device or environment from or in which the document 300 was created or submitted.

In the illustrated example, certain information is reflected in relatively less structured formats than other information. For example, document data section 306 of document 300 includes numerous specific fields that can be represented directly, e.g., by corresponding database entries that represent or include the knowledge or data in those fields. In contrast, document text section 304 includes relatively less structured information, including the phrase "The 'fullscreen' button on Modern apps should be in a different place."

To a trained human, e.g., a software developer, the phrase "The 'fullscreen' button on Modern apps should be in a different place" can immediately convey a suggestion from user JDoe regarding the positioning of the "fullscreen" button. However, this knowledge is represented in a relatively unstructured format. In some examples, inference engine 124 can process relatively unstructured data such as document text section 304 to infer various motifs, e.g., problems such as software failures, actions such as replacing a failed power supply, or suggestions such as moving the "fullscreen" button on a Modern app.

Figure 4:
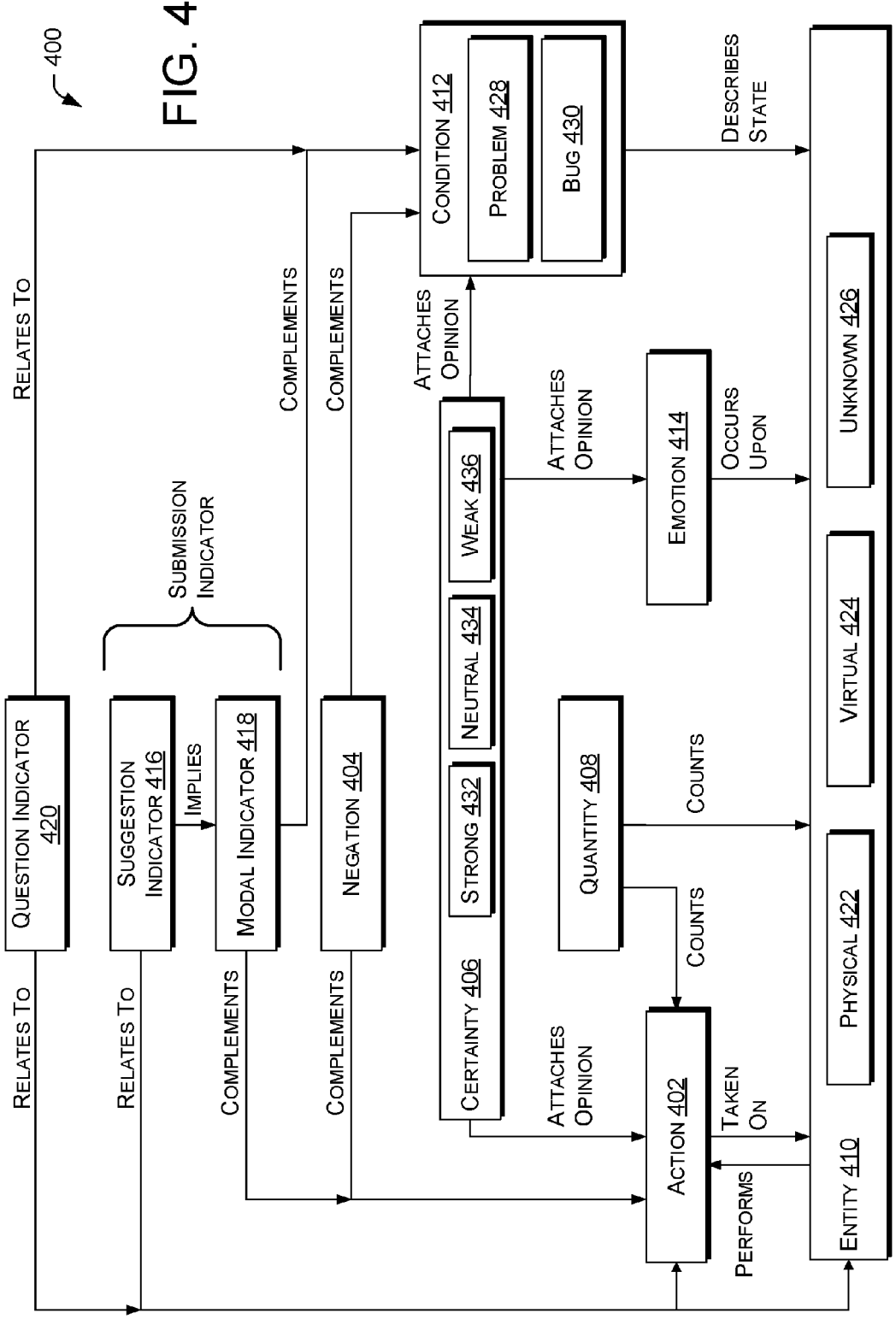
FIG. 4 shows an example ontology that can be employed in accordance with some examples.

FIG. 4 shows an example ontology 400 useful for representing the "semantic interpretation" of domain knowledge for a domain. Ontology 400 includes interconnected classes or hierarchies of classes. In some implementations, classes and subclasses in the ontology are defined and arranged in a taxonomy, as represented by nested blocks in FIG. 4. Labels on connectors indicate syntactical or grammatical interactions that are considered valid between the connected classes. Example classes that can be used in an ontology related to documents 108 are set forth in Table 1. Words or phrases corresponding to specific classes or subclasses of ontology 400 are referred to as "instances" of those classes or subclasses. Further examples of ontologies are discussed in U.S. application Ser. No. 13/535,366, entitled "Problem Inference from Support Tickets," filed on Jun. 28, 2012, and U.S. application entitled "Utilizing Semantic Hierarchies to Process Free-Form Text", filed concurrently herewith, both of which are incorporated herein by reference.

TABLE 1

| Ontology Class | Describes |
| --- | --- |
| Entity | Thing that exists |
| Action | Behavior that can be caused or carried out upon, using, or by an entity |
| Condition | Describes the state of an entity |
| Quantity | Describes the quantity of an entity/action |
| Negation | Negates a word or phrase |
| Certainty | Adds strength/weakness to a phrase |
| Emotion | Feelings or beliefs held by the writer of the user text |

TABLE 1-continued

| Ontology Class | Describes |
| --- | --- |
| Suggestion Indicator | Indicates that associated portion(s) of the user text represent suggestions, e.g., regarding items such as software or hardware |
| Modal Indicator | Indicates that an associated Action in the user text is hypothetical or desirable. |
| Question Indicator | Indicates that associated portion(s) of the user text represent questions, e.g., regarding items such as software or hardware |

The ontology can be constructed to relate the various ontology classes and subclasses according to defined interactions, and can be stored in the knowledge base 228. For example, individual phrases appearing in document(s) 108 can be mapped to the classes of an ontology. The mapping of the phrases to the ontology 400 can be stored in the knowledge base 228, e.g., as discussed below with reference to FIG. 5.

Ontology 400 can be used to express relationships between the different classes, which can provide for concise expression of pertinent information included in suggestions 110. Each class or subclass can have mapped to it one or more phrases and can correspond to some information provided by a document 108. In some implementations, the domain expert or other individual can select the particular class/subclass for each phrase, possibly assisted by a tool and/or partial automation.

The example ontology 400 can include one or more of the classes from Table 1, e.g., Entity, Actions, Condition, Incident, Quantity, Negation, Certainty, Emotion, Suggestion Indicator, Modal Indicator, and Question Indicator. Each class is represented by a corresponding block in FIG. 4, e.g., action class 402, negation class 404, certainty class 406, quantity class 408, entity class 410, condition class 412, emotion class 414, suggestion-indicator class 416, modal-indicator class 418, and question-indicator class 420. As illustrated by the nested blocks, any particular class and its subclasses can be represented as trees or graphs of nodes in a taxonomy for that class.

Arrows and labels in FIG. 4 graphically represent relationships between individual classes consistent with the ontology 400. These relationships represent valid interactions between the ontology classes. For example, an action "taken" on an entity is a valid interaction according to the ontology 400, as shown by the arrow connecting the action class 402 to the entity class 410. Conversely, an action "taken" on a condition would not be a valid interaction according to the ontology 400 since there is no corresponding arrow illustrating such a relationship between the action class 402 and the condition class 412.

The Entity class 410 can correspond to phrases that represent an entity, i.e., a thing that exists in a real or virtual sense. In some examples, the entity can be a technical entity, such as a technical word or phrase. Examples include product names such as "XBOX," "PLAYSTATION," "LINUX," and "WINDOWS," component names such as "hard drive," and service names such as "cloud service." The entity class can include subclasses such as Physical-entity subclass 422 or Virtual-entity subclass 424. For example, a Physical Entity can be a tangible object such as an accelerometer, a gaming console. A Virtual Entity can be an intangible object such as a protocol, reference, variable, library, or method. Other examples of entities can include services, e.g., cloud services, and software entities.

In some examples, the Entity class 410 can have an "unknown-entity" subclass 426. The unknown-entity subclass 426 can be used in conjunction with sentences or other blocks of free-form user text that do not contain an identifiable entity, as described below with reference to FIG. 5. In some examples, the Entity class 410 can include subclasses such as a replaceable entity or a maintenance entity.

The Action class 402 can correspond to phrases that represent a behavior that is taken or carried out on or using an entity, or a behavior performed by an entity. Actions can include, e.g., behaviors a user is trying to accomplish with an entity or what a user expects an entity to do. Subclasses of the action class can include those that interact with an entity and/or alter the state of the entity, such as, for example, a Physical Action (e.g., replace, switch off, switch on, reboot, restart, open, etc.), a Maintenance Action (e.g., update, upgrade, downgrade, etc.), a Troubleshooting Action (e.g., test or inspect), and/or a Virtual Action (e.g., install, wipe, copy, access, animate, build, change, navigate, etc.).

The Condition class 412 can correspond to phrases that describe the state of an entity, e.g., an entity can have a faulty condition such as "illegal reference." Example conditions can include properties, modes or abnormal conditions (either physical or virtual), e.g., of an entity "failing to execute," "crashing," or "working intermittently." Words and phrases used in an instance of condition class 412 can be, e.g., subjective, e.g., "crashing," or categorical, e.g., "low" or "high." Example conditions can include problem conditions 428 (e.g., error, freeze, problem, difficult, etc.), or bug conditions 430 (e.g., representing software behavior determined to be faulty due to error in the software rather than in its environment).

The Quantity class 408 can correspond to words or phrases that count or describe the quantity of, e.g., an entity (e.g., two virtual desktops) or an action (e.g., clicked twice). Some implementations can use LowQuantity, MediumQuantity, and HighQuantity subclasses to distinguish phrases that reflect relatively low, moderate, and high quantities depending upon the context. A quantity can also be used to reflect severity, e.g., LowQuantity can correspond to a relatively minor or low volume incident whereas HighQuantity can correspond to a relatively major or high volume incident.

The Negation class 404 can correspond to words or phrases that negate one or more other words or phrases, e.g., "did not reinstall the prior version." The negation class can include a SyntheticNegations subclass that uses verbs or nouns to negate a condition, incident or action, e.g., phrases such as "absence of," "declined," "denied," and the like. The Negation class 404 can also include AnalyticNegations subclass that uses "not" to negate a condition, incident or action.

The Certainty class 406 can correspond to words or phrases that represent confidence of the user regarding an entity, condition, or emotion represented in the free-form user text, e.g., by adding strength or weakness to a word or phrase. In the example sentence "I confirm that the keyboard shortcuts work," "confirm" can be associated with the certainty class 406. The certainty class 406 can include a StrongCertainty subclass 432, e.g., phrases such as "confirm" or "affirmative" that denote certainty or high confidence. The certainty class 406 can also include a NeutralCertainty subclass 434, e.g., phrases such as "not sure." The certainty class 406 can also include a WeakCertainty subclass 436, e.g., phrases such as "unlikely" or "doubtful" that denote uncertainty or low confidence. Note that phases in the WeakCertainty subclass can be phrases that may not explicitly indicate negative sentiment, but rather tend to be used by individuals when speculating about the nature of, e.g., a missing feature or unexpected behavior in software or hardware.

The Emotion class 414 can correspond to words or phrases that represent feelings or beliefs of the user writing the free-form user text. For example, in the sentence "MICROSOFT is great," "great" is an emotion the writer feels about the entity "MICROSOFT". Other example instances include "awesome," "lousy," "angry," "satisfied," etc.

The suggestion-indicator class 416 can correspond to words or phrases that represent the presence of a suggestion. Example instances of the suggestion-indicator class 416 can include, e.g., "allow," "enable, "improve," "make it possible, "please," "you should," "should," etc.

The modal-indicator class 418 can correspond to words or phrases, such as modal auxiliaries in English, that indicate that an associated Action 402 in the free-form user text is hypothetical or desirable. Example instances of modal-indicator class 418 can include, e.g., "it would be nice", "it would", "could," etc. In some examples, instances of the modal-indicator class 418 can include, e.g., imperative verbs such as "add," "change," or "remove." In some examples, an instance of suggestion-indicator class 416, e.g., "you should," implies or includes a corresponding instance of modal-indicator class 418, e.g., "should." As used herein, the term "submission indicator" refers to an instance of suggestion-indicator class 416 or of modal indicator class 418, or any combination thereof.

The question-indicator class 420 can correspond to words or phrases that represent the presence of a question, or words or phrases that are used to elicit information, e.g., regarding items such as software or hardware, or other, e.g., entities, actions, or conditions. Example instances of question-indicator class 420 can include, e.g., "what does this mean," "how does this work," "why is my program crashing," "how to play my videos," or "where is my program installed?"

Other classes can be present. For example, a Property class can represent static, volatile, dynamic, or other properties of entities. A Privacy class can correspond to words or phrases that indicate a user's expectations or desires with respect to access to information or other entities, e.g., "personal" or "public."

Example instances of entity class 410 can include products, features, services, and components. For example, an entity class 410 may represent or include words related to a feature, product, software, or thing, such as "account," "password," "drive," "keyboard," "mouse," "screen," "computer," "phone," "interface," etc.

Example instances of condition class 412 can include states, e.g., properties, modes or (abnormal) conditions (either physical or virtual), associated with an entity, such as "failing to execute," "crashing," "working intermittently," etc. A state of an entity may be binary (e.g., up vs. down), subjective (e.g., crashing), categorical (e.g., low, high, etc.), quantitative (e.g., 'level 3') or other types, as well as their combinations. In some examples, condition instances can be associated with instances of actions 402, conditions 412 (e.g., problem conditions 428 or bug conditions 430), questions 420, certainties 406, submission indicators (e.g., suggestion indicators 416 or modal indicators 418), quantities 408, emotions 414, etc.

Example instances of action class 402 may include words or phrases that represent a behavior that is taken or carried out on or using an entity, or a behavior performed by an entity, such as "click," "browse," etc.

Example instances of problem-condition class 428 may include words or phrases that represent a problem or issue with an entity, such as "crashing," "disconnected," etc.

Examples instances of a submission indicator class (e.g., instances of suggestion-indicator class 416 or modal-indicator class 418) may include words or phrases that relate to a new behavior or change in an existing behavior of an entity, such as "add new shortcut," "change API call/settings name," "remove animations," etc. For example, the suggestion-indicator class 416 may include words or phrases that relate to a feature request by a user.

Example instances of a question class 420 may include words or phrases that are used to elicit information, such as "what does this mean," or "how does this work," etc.

Example instances of an emotion class 414 may include words or phrases that represent feelings or beliefs of a user, such as "like new app interface," "find animations confusing," etc.

A domain expert or other individual can assign specific words or phrases, e.g., remaining in the post-filtered subset discussed below with reference to the phrase-filtering module 236, to one or more classes or subclasses of ontology 400. In this way, the knowledge base 128 can include a mapping of various phrases in the documents 108 to classes and/or subclasses of the ontology 400. The ontology 400 can be constructed to relate the various ontology classes and subclasses according to defined interactions and can be stored in the knowledge base 128.

FIG. 4 shows an example of a domain ontology 400. The knowledge base 228 can include one or more domain ontologies. The knowledge base 228 can additionally or alternatively include one or more global or universal ontologies covering terms in at least two domains.

Figure 5:
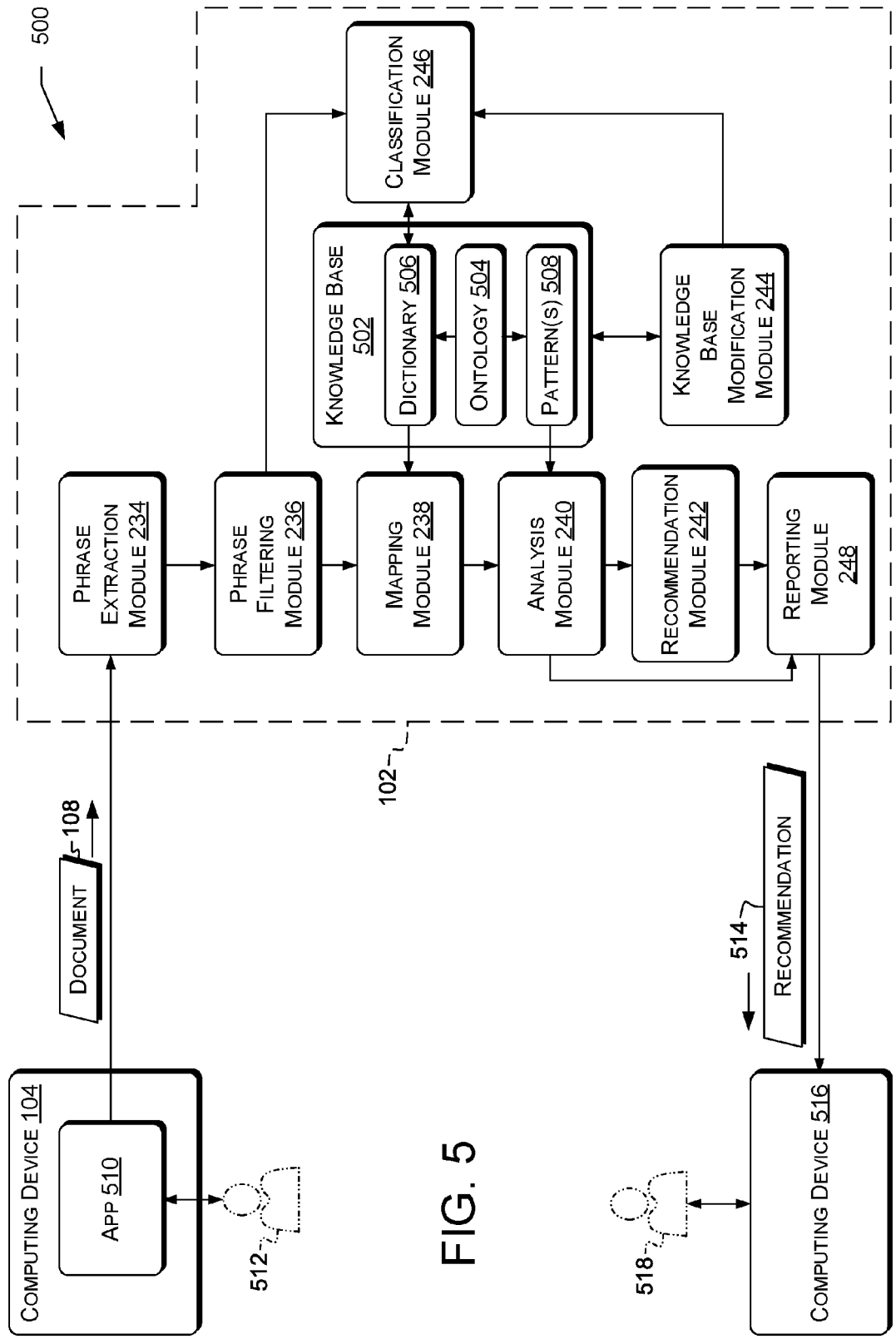
FIG. 5 is a dataflow diagram depicting example module interactions during provision of documents, text analysis of those documents, and updating of a dictionary.

FIG. 5 is a dataflow diagram 500 illustrating example interactions between the modules illustrated in FIG. 2. Some of the modules make use of a knowledge base 502, which can represent the knowledge base 228, FIG. 2. The knowledge base 502 can be stored on the computer-readable media 220, FIG. 2. The knowledge base 502 can include an ontology 504, a dictionary 506 and a pattern set 508 including one or more grammar pattern(s). The dictionary 506 can include a trie or other data structure mapping individual words or phrases of the free-form user text of the respective document to individual classes of a model, e.g., the ontology 504. The pattern set 508 can include a formal grammar, e.g., a context-free grammar (CFG), or other representation of a mapping between sequences of classes of the model and motifs. Other examples of patterns in the pattern set 508 are discussed below with reference to the phrase-filtering module 236. In some examples, ontology 504 is represented implicitly in a set of classes shared at least in part between dictionary 506 and pattern set 508. "Classes" can also be referred to as "labels" that identify a function or role of the word or phrase in the free-form user text of a document 108. In some examples, the knowledge base 502 can also include a synonym list used to collapse various synonymous terms into a standardized term. For example, the terms "browser," "Internet Explorer" and "IE10" can each mean the same thing in the context of a software entity. In this way, entries in the synonym list for each of these terms can map to "browser," for example.

Some phrases may not be suited for use within the ontology 400, e.g., because of reduced specificity relative to other phrases. For example, in the context of suggestions for the source code of open-source projects, the phrase "handler" may lack specificity compared to the phrase "interrupt handler" for the purposes of understanding a suggestion. The phrase "interrupt handler" is more specific and provides more context for semantic interpretation. For this reason, in some implementations, the knowledge base 228 can includes phrases that are determined to be sufficiently specific for mapping to the ontology. For example, the bigram "interrupt handler" can be mapped in knowledge base 228 to a particular class and/or subclass of the ontology 400 model and the unigram "handler" can be omitted from knowledge base 228

In some examples, a computing device 104 can run or otherwise host an app 510, e.g., a smartphone app, desktop application, or command-line utility. For example, the processing unit 116, FIG. 1, of computing device 104 can execute one or more program module(s) of the app 510, e.g., computer program instructions 226, FIG. 2. The app 510 can interact with a user 512. Via the app 510 and/or other component(s) of computing device 104, user 512 can provide a document 108, e.g., as discussed above with reference to FIG. 3. In some examples, the app 510 or other(s) component of computing device 104, can transmit and receive data such as documents 108 or suggestions 110, e.g., via an HTTP connection carrying API messages in the representational state transfer (REST) or Web Services styles.

A computing device 102 can receive one or more document(s) 108, e.g., using communications module 230, FIG. 2 (omitted here for brevity) or another interface. The computing device 102 can determine one or more suggestions 110, FIG. 1, or recommendations 514. The computing device 102 can then transmit the suggestions 110 or recommendations 514 to a computing device 516 of or associated with a user 518, e.g., a system administrator or manager, that is associated with management of the software or hardware that is a subject of the document 108.

In some examples, the phrase-extraction module 234 can be configured to identify various phrases (e.g., n-grams) that can appear in the document 108. For example, the phrases can be repeated patterns of linguistic elements, e.g., n-grams of length one or more that appear in multiple instances in the documents 108. The phrase-extraction module 234 can apply a two-pass phrase extraction technique to obtain a frequency estimate of n-grams in the documents 108.

In some examples, the phrase-extraction module 234 is configured to perform one or more of the processing acts described below. In some examples, text in the documents 108 can be tokenized into sentences. For example, the documents 108 can be parsed into individual unigrams (e.g., words) and delimiters such as periods can be used to identify sentences. In some examples, redundant phrase extraction can be performed on documents 108 via word-level compression. The phrase-extraction module 234 can use a compression algorithm to operate on the tokenized documents. For example, some implementations can use a Lempel-Ziv-Welch ("LZW") or other "dictionary-based" compression algorithm to build a compression dictionary of phrases (e.g., sequences of unigrams) from the tokenized documents 108, although other compression algorithms can be used as well. Note that the compression dictionary is independent of dictionary 506 in knowledge base 502. Generally, the compression algorithm can compress the text of the tokenized documents 108 and output compressed text while building a compression dictionary of each phrase that appears in the compressed text. In some examples, the compressed output (e.g., a compressed binary) is discarded and the compression dictionary is retained for subsequent processing. The compression dictionary can include some or all sequences of phrases of any length, e.g., applying the compression to just the phrase "the regular order" from the document text section 304, FIG. 3, can result in compression-dictionary entries including "the", "regular", "order", "the regular", "regular order", "the regular order", and so on for the entire document 108. Note that some implementations can include only repeated phrases in the compression dictionary. Relatively infrequent phrases can use longer encoding since they will have less of an impact on the size of the compressed output.

The documents and the compression dictionary can then be used to perform frequency estimation of redundant phrases. The frequency estimation can be performed using a pattern matching technique such as the Aho-Corasick algorithm. For example, an ordered representation of the compression dictionary can be constructed. For example, a finite state automaton (e.g., a trie) can be used to represent the compression dictionary, with an empty string at the root, unigrams at layer 1, bigrams at layer 2, and so on. Generally speaking, the trie can be used to look up individual phrases in the compression dictionary.

Frequency estimation can be performed for individual phrases in the documents 108. For example, the frequency estimation can be performed in a single pass over the documents 108 to match phrases (n-grams) in the documents 108 to entries in the trie. The estimated frequencies can include respective frequenc(ies) with which individual entr(ies) in the compression dictionary appeared in the documents 108.

In some examples, the phrase-filtering module 236 can be configured to filter the extracted phrases from the phrase-extraction module 234 to identify a subset of the phrases that have relatively significant meaning, e.g., that may contribute to understanding the suggestion 110 or other motif in the document 108. Generally speaking, the phrase-filtering module 236 can apply filtering to the phrases identified by the phrase-extraction module 234 to eliminate certain phrases, e.g., using the frequencies estimated by phrase-extraction module 234 or other criteria. The phrase-filtering module 236 can also apply information theoretic measures to perform filtering based on computed importance of the n-grams.

In some examples, phrases that appear frequently in the existing documents 108 can be useful for inferring motifs from the documents 108, e.g., the phrases "microsoft windows" and "user option" may be helpful in understanding motifs in a document 108 that suggests an additional user option be added to MICROSOFT WINDOWS. In contrast, other phrases can also appear frequently in the documents 108, but these phrases can be less useful for understanding, e.g., specific motifs in the documents 108. For example, the sentence "I love it!" may not be not helpful for identifying a user suggestion 110. In other examples, when documents 108 are emailed, stock phrases such as "in reply to" and "message forwarded on" may occur very frequently but not be directly indicative of a motif, e.g., a user suggestion 110.

In other examples of emailed documents 108, "reply all" messages can tend to duplicate prior conversations. This can result in some phrases appearing frequently in the documents 108 even if they do not relate directly to a motif in those documents 108. In some examples, the phrase-filtering module 236 is configured to filter out such phrases automatically while retaining other phrases that do tend to contribute to or indicate motifs in the documents 108.

In some examples, the phrase-filtering module 236 is configured to perform one or more of the processing acts described below. In some examples, repeated phrases and their frequencies can be obtained, e.g., from phrase extraction module 234. As discussed above, the phrases can include n-grams of varying lengths, e.g., unigrams, bigrams, etc., up to arbitrary lengths. Phrases can then be removed from further consideration using one or more filters.

In some examples of filters, length and/or frequency filtering can be performed. For example, relatively long-length phrases tend to be "noisy" n-grams due to long repeated phrases (e.g., automated phrases) in the documents 108. Emails, and frequently-repeated templates can include long phrases that appear often in the documents 108. Such phrases tend to be relative long in length, e.g., many automated emails can include phrases such as "if you need assistance outside of these hours please call the toll free number . . . " and so on. Such phrases tend to be of relatively little value in inferring motifs from a document 108. Thus, relatively long repeated phrases, e.g., over a length of 20 words, can be filtered out regardless of how many times the phrases appear in the documents 108.

In some examples of filters, relatively low-length phrases that appear with relatively low frequency can be filtered out. Examples of relatively low frequencies can include, e.g., phrases occurring in less than a certain percentage (e.g., 1%) of the documents 108 or occurring fewer than a selected of times (e.g., <10 occurrences in 1000 documents 108). These phrases can include, e.g., multiple instances of mistyped words, such as "shuold read my mnd."

In some examples of filters, unigrams, stop words or phrases, or phrases containing numbers can be filtered out.

The phrase-filtering module 236 can be configured to apply any of the above-noted filters or other filters to the identified phrases. For example, in determining user suggestions related to the APPLE IPHONE, the phrase-filtering module 236 can be configured to retain (i.e., not filter out) phrases containing numbers. This can permit distinguishing suggestions relating to products whose names differ only by a number (e.g., IPHONE 5 versus IPHONE 6).

In some examples, the phrase-filtering module 236 can be configured to perform part-of-speech processing to select phrases remaining after filtering that match predetermined (or otherwise selected) part-of-speech patterns. For example, Justeson-Katz (J-K) collocation filtering can be applied to identify phrases matching part-of-speech patterns such as [.* Adjective Noun .*], [.* Noun Noun .*], [.* Adjective Adjective Noun .*] [.* Adjective Noun Noun .*] [.* Noun Adjective Noun .*] [.* Noun Noun Noun .*] [.* Noun Preposition Noun .*], etc. Phrases matching the part-of-speech patterns can be selected and other patterns discarded.

As used herein, patterns, including part-of-speech patterns and grammar patterns, are represented textually surrounded by square brackets ("[", "]"). In the listed J-K patterns and other patterns herein, ".*" represents zero or more instances of any element, e.g., a character or word (e.g., excluding newlines). Adjacent elements are matched in order in patterns herein. The term "pattern," as used herein, is not restricted to patterns expressible with this specific form of textual representation. "Patterns" can include literal word or word-sequence matches, regular expressions, context-free grammars, context-sensitive grammars, recursive grammars, or other computational models configured to determine, for a segment of user text or tagged user text (e.g., a tag sentence, as described below), whether that user text matches or otherwise satisfies the pattern.

In some examples, the phrase-filtering module 236 can be configured to perform filtering, e.g., of the selected phrases, based on one or more information theoretic measures. For example, residual inverse document frequency (RIDF) and mutual information (MI) measures can be computed for individual phrase(s) remaining after any previously-applied filtering or selecting processing. RIDF represents a difference between the proportion of documents 108 that contain a term (word or phrase) and the proportion of documents 108 that would contain the term under a random model following, e.g., a Poisson distribution. MI represents a difference between the probability of two words appearing together and the probabilities of those words appearing independently.

In some examples, the phrase-filtering module 236 can be configured to select n-grams with relatively negative MI scores (e.g., below a threshold of, e.g., −10). These words tend not to be found in standard dictionaries, e.g., because they include technical words or terms used in unconventional ways. In some examples, the phrase-filtering module 236 can be configured to select n-grams with relatively high RIDF scores, e.g., above a threshold of 4. In some examples, the phrase-filtering module 236 can be configured to select n-grams with both relatively negative MI and relatively high RIDF scores. In some examples, phrases with negative MI and high RIDF tend to be domain-specific phrases that do not appear in conventional dictionaries and can be added to a domain-specific dictionary 506 for further processing. Words or phrases not selected can be discarded, in some examples.

In some examples, the phrase-filtering module 236 can be configured to select words or phrases with high RIDF (e.g., above a threshold of 4) and positive MI (e.g., above a threshold of 0.0) from the documents 108. These words or phrases can include words that are part of a general vocabulary (e.g., words found in a conventional English dictionary). Such phrases tend to be included in sentences and can be useful for motif inference, subject/object differentiation, and/or other subsequent processing discussed herein. Words or phrases not selected can be discarded, in some examples.

In some examples, the mapping module 238 can be configured to receive individual words or phrases of the free-form user text of the individual ones of the plurality of documents 108 including free-form user text, and to map one(s) of the received individual words or phrases to individual classes of a model, e.g., an ontology 400 or 504. The terms "mapping" and "tagging" are used interchangeably herein to describe techniques or processes for associating classes with words or phrases. A particular word or phrase can have one or multiple tags, i.e., can be associated with one or more classes of the model. For example, the word "should" can be associated with both the suggestion indicator class 416 and the modal indicator class 418, both FIG. 4. The model can include one or more classes such as those described above with reference to FIG. 4, e.g., a suggestion-indicator class. As used herein, the term "tag sentence" refers to a sequence of tags corresponding to some or all of the free-form user text, arranged in the same order in which the corresponding words or phrases are presented in the user text. A tag sentence is not required to correspond to a complete sentence in the user text. In some examples, individual tag(s) in a tag sentence can be associated with corresponding words or phrases. Tag sentences are represented in this document as quoted lists of <word or phrase>/<class> pairs, e.g., "ball/Entity bounce/Action" for the sentence "the ball bounces."

In some examples, the mapping module 238 can be configured to determine, for individual sentence(s) or other delimited subsets of the free-form user text, whether an entity (a word or phrase of entity class 410) is present in that sentence or other subset. In some of these examples, if no entity is present, the mapping module 238 can add to the tag sentence an unknown-entity class 426, even in the absence of a specific word or phrase with which to associate the unknown-entity class 426.

For example, in the sentence "if it could work better, that would be great," the subject, "it," is a stopword and so is filtered out in this example. As a result, no instance of entity class 410 is expressly identified in the sentence. The result of the phrase-extraction module 234, the phrase-filtering module 236, and the mapping module 238 can be the tag sentence "could/Modal-Indicator work/Action would/Modal-Indicator great/Positive-Emotion." Since no entity is present in this tag sentence, the mapping module 238 can add an instance of the unknown-entity subclass 426 to provide to the analysis module 240 the tag sentence, e.g., "-/Unknown-Entity could/Modal-Indicator work/Action would/Modal-Indicator great/Positive-Emotion" or "work/Action would/Modal-Indicator great/Positive-Emotion-/UnknownEntity could/Modal-Indicator," where "-" represents the instance of the unknown-entity subclass 426.

In some examples, the analysis module 240 can be configured to identify motifs expressed in the documents 108. For example, analysis module 240 can determine, for individual ones of the plurality of documents, corresponding user suggestions (text corresponding to a suggestion motif). The user suggestions can be, e.g., suggestions regarding software or hardware, suggestions regarding an update to a software or hardware element, suggested action(s) to be taken to improve an entity, or suggestions regarding an item, e.g., a product, machine, service, or any of those sold via electronic commerce.

In some examples, the analysis module 240 can be configured to identify actionable items, i.e., selected motifs found in user feedback or other free-form user text. User feedback may be identified as including an actionable item when a particular motif is associated with the user feedback. An actionable item may generally include a problem motif, a suggestion motif, a question motif, or other motif that may require attention of a user (e.g., an administrator or other user 518). For example, if the analysis module 240 determines that a sentence is associated with a problem motif, the analysis module 240 may determine that the sentence relates to an actionable item (e.g., a problem). To illustrate, a sentence that states "These account settings are confusing" may be associated with a problem for an account entity (e.g., problem motif—(account settings)/Entity followed by (confusing)/ProblemCondition). Here, the sentence is flagged as including an actionable item so that an administrator of the account settings may address the problem. In some examples, the actionable item can include a user suggestion regarding software or hardware, e.g., "my computer should levitate" (computer/Entity should/Suggestion-Indicator levitate/Action).

Analysis module 240 can identify these motifs, e.g., user suggestions 110, FIG. 1, based at least in part on a comparison of the mapped words or phrases for the respective document to a predetermined (or otherwise selected, and likewise throughout) grammar pattern, e.g., stored in the pattern set 508. For example, analysis module 240 can identify these motifs based at least in part on individual one(s) of the mapped words or phrases for the respective document 108 that match a predetermined grammar pattern or on mapped words or phrases of the respective document match the predetermined grammar pattern for a motif, e.g., a suggestion motif. Example grammar patterns can express relationships between classes in a tag sentence such as proximity or order. These relationships can be expressed, e.g., using CFGs or other grammars, e.g., regular expressions that treat tags as atomic rather than characters of text and that can thus be applied to tag sentences. In some examples, analysis module 240 can apply the predetermined grammar patterns to the tag sentences, e.g., to the mapped classes and subclasses corresponding to the user text. In some examples, the pattern set 508 can be updated dynamically, e.g., to add, remove, or modify patterns, during analysis of a user text or between analyses of two user texts.

In some examples, the analysis module 240 or other component(s) of the computing device 102 are configured to identify set(s) of one or more of the mapped words or phrases that correspond to the predetermined grammar pattern. In some of these examples, the predetermined grammar pattern is associated with a motif representing a user suggestion 110. In some examples, the predetermined grammar pattern can define a first class of the model preceding a second class of the model. In some examples, the predetermined grammar pattern can indicate that a suggestion-indicator class 416 (the first class) followed by an entity class 410 (the second class) corresponds to a motif representing a user suggestion 110, e.g., "It would be nice if WINDOWS . . . ". In some examples, the predetermined grammar pattern can indicate that a modal-indicator class 418 (the first class) followed by an entity class 410 (the second class) corresponds to a motif representing a user suggestion 110, e.g., "add/Modal-Indicator new shortcut/Entity," "change/Modal-Indicator API/Entity call or settings name," or "remove/Modal-Indicator animations/Entity." In some examples, the predetermined grammar pattern for the suggestion motif defines a first class of the ontology 504 preceding a second class of the ontology 504. The first class or the second class in some of these examples comprises a suggestion-indicator class 416 for words or phrases that represent presence of a suggestion in the free-form text of document(s) 108.

Example grammar patterns for various motifs are listed in Table 2. Square brackets surround patterns, parentheses denote grouping, and vertical bars ("|") denote alternation, i.e., matching any of the options separated by the vertical bars in a particular group. The mapping module 238 can be configured, in some examples, to apply one or more of the example patterns in Table 2 to the tag sentence or tagged text from the phrase-filtering module 236.

TABLE 2

| Motif | Example Pattern |
|---|---|
| Suggestion | [.*(Modal-Indicator.* Action|Suggestion-Indicator).*] preceding or following [Entity] |
| Suggestion | [Submission-Indicator] preceding or following [Entity] |
| Suggestion | ([Submission-Indicator] preceding or following [Entity]) followed by [Action] |
| Problem | [Problem-Condition|Condition|Negation.* Action] |
| Problem | [Entity] preceding or following [Problem-Condition] |
| Action | [Entity] preceding or following [Action] |
| Question | [Entity] preceding or following [Question-Indicator Action| Question-Indicator Problem-Condition] |
| Question | [Entity] preceding or following [Question-Indicator Negation.* Action] |

In an example, the tagged sentence "HALO/Entity should/Modal-Indicator teleport/Action me in real life" matches the pattern in the first row of Table 2 since it has a group of an instance of modal-indicator class 418 followed by an instance of action class 402, and that group follows an instance of entity class 410.

In some examples, the patterns can include subpatterns, or subpatterns can be used to compose a higher-level pattern in a recursive manner. For example, [Entity] can represent [Virtual-Entity|Physical-Entity|Replaceable-Entity|Maintenance-Entity]. In another example, [Submission Indicator] can represent [Suggestion-Indicator|Modal-Indicator].

In some examples, the analysis module 240 is configured to query the dictionary 506 using one(s) of the words or phrases from the phrase-filtering module 236. The dictionary 506, e.g., implemented using a trie or hash map, can provide class(es) of the model, e.g., ontology 504. The identified occurrences of the words or phrases can be tagged, e.g., in the free-form text or in sentences extracted therefrom, according to the provided class(es).

In some examples, the analysis module 240 is configured to process the tagged text of the documents to identify valid interactions according to the ontology 504. Document(s) 108, or individual sentence(s) in document(s) 108, can be filtered out if they do not include valid interactions according to the ontology 504. Examples of valid interactions are discussed above with reference to FIG. 4.

In some examples, the analysis module 240 is configured to infer motifs from the tagged sentences, e.g., those not filtered out based on interactions. Nonlimiting examples of motifs can include Problems, Actions, or Suggestions. Problems can identify a particular entity (e.g., operating system or hard drive) and associated state, condition, or symptoms (e.g., crash or defective). Actions can identify actions performed by or on an entity, e.g., to improve or alter the state of the entity, such as rebooting a computer or restarting an application. Suggestions can identify user suggestions, e.g., regarding improvement of hardware or software, e.g., "make it more reliable" or "allow font sizes of 6.14 points."

Note that the Action motif is different from the action class 402 of the ontology 400. The Action motif is an inferred meaning obtained from a given document 108, whereas the action class 402 is a way of identifying selected words or phrases in the dictionary 506. A document 108 containing a word or phrase tagged with the Action class 402 may or may not include text corresponding to the Action motif.

In some implementations, the analysis module 240 can be configured to match certain grammar patterns to the tagged sentences to identify the motifs. For example, the analysis module 240 can use different grammar patterns for each of the types of motifs, e.g., Problems, Actions, or Suggestions. The grammar patterns can be built using the classes or subclasses of the model, e.g., ontology 504. Examples are discussed above with reference to Table 2.

In some implementations, the analysis module 240 can analyze both unstructured data such as free-form text in the documents 108 and structured data from the documents 108 and/or other data. In some examples, structured data from a document 108 (e.g., Survey Question ID or Survey Response from document data section 306, FIG. 3) can be appended to the free-form text and analyzed as discussed above. In some examples, structured data can be tagged by mapping module 238 and tested against grammatical patterns in pattern set 508.

In some examples, inferred motifs can be verified against data in the document data section 306, e.g., a flag indicating that a suggestion is present in the document text section 304 of a given document 300. For example, the analysis module 240 can be configured to compare motifs directly extracted from structured data to motifs inferred from free-form text to see if the motifs match. In some examples, the analysis module 240 can be configured to infer the motifs based at least in part on data external to the documents 108, e.g., automatic-upgrade cycles of software entities or batch numbers of parts used in hardware entities. For example, the analysis module 240 can determine that a Suggestion motif is present using more relaxed grammar patterns during the week following a software rollout than in subsequent weeks.

In some examples, the recommendation module 242 can be configured to analyze individual ones of the user suggestions 110 from analysis module 240 to generate one or more recommendation(s) 514, e.g., regarding an update to the software or hardware. The recommendation module 242 can determine the recommendation(s) 514, e.g., as the top-ranked one or more items in a ranked list of the suggestions 110. The recommendation module 242 can determine the recommendation(s) 514, e.g., based on the number of times a particular suggestion 110 has been made (e.g., determined for the plurality of documents 108), based on metadata associated with suggestions 110 (e.g., a count of "Like" or "Me Too" comments on a user feedback site), or based on relative priorities of the entities identified in the suggestions 110 (e.g., suggestions related to an operating system, such as WINDOWS, might be higher or lower priority than suggestions related to an application program such as OFFICE in various example configurations of recommendation module 242).

Reporting module 248 can be configured to present or transmit an indication of the recommendation 514, e.g., as discussed above. For example, the reporting module 248 can be configured to send the recommendation to a computing device 516 of a user 518 that is associated with management of the software and/or hardware, as discussed above. The reporting module 248 can additionally or alternatively transmit indication(s) of one or more of the suggestion(s) 110 from the analysis module 240. For example, the reporting module 248 can include or communicate with a database front-end or Web server to provide dashboard or other user-interface representations of suggestion(s) 110 or recommendation(s) 514.

In some examples, a recommendation 514 includes a ranking of the user suggestions 110, e.g., based on selected ranking criteria. In some of these examples, a first user suggestion 110 is ranked higher than a second user suggestion 110 when the first user suggestion 110 occurs more frequently in the plurality of documents 108 than does the second user suggestion 110. In some examples, a recommendation 514 includes a ranking determined based at least in part upon ranking criteria that can include at least some of: pre-defined knowledge, specific top-k suggestions ($k \in \mathbb{Z}$), or which user or data channel was the source of the document 108 including the suggestion.

In some examples, the knowledge-base modification module 244 is configured to determine a first word or phrase in the free-form user text. For example, the knowledge-base modification module 244 can determine a word or phrase not represented in the dictionary 506 of the knowledge base 502. The knowledge-base modification module 244 can then determine that the first word or phrase has a threshold level of similarity to a second, different word or phrase represented in the dictionary 506 of the knowledge base 502. The threshold level of similarity can be, e.g., a subset relationship or a specified Hamming distance in tokens. For example, the phrase "SQL SERVER 2012" is a subset of the phrase "SQL SERVER 2012 R2 ENTERPRISE EDITION." In this example, the knowledge-base modification module 244 can determine that the former has the threshold level of similarity to the latter. The knowledge-base modification module 244 can then replace the second word or phrase in the dictionary 506 of the knowledge base 502 with the first word or phrase. This can permit reducing the memory consumption and computational load of the dictionary 506 while retaining accuracy in identification of motifs in documents 108, or balancing accuracy and memory consumption. For example, the level of specificity or generality of words or phrases in the dictionary 506 of the knowledge base 502 can be adjusted, e.g., to provide effective detection of motifs in a given set of documents 108.

In some examples, the knowledge-base modification module 244 is configured to add, for individual words mapped to at least one class of the model, at least one of one or more synonyms of the respective word or one or more lexical or morphological forms of the respective word to a knowledge base 502 dictionary 506 associated with the model. A morphological form of a term can include, e.g., a stem of a term plus any endings (suffixes) of the stem (e.g., for a stem of "confuse"—"confusing," "confused," "confuses," "confusion," etc.). In an example, the dictionary 506 includes the word "work" associated with the condition class 412. The knowledge-base modification module 244 can use a stemming algorithm or other information to add "working," "works," and "worked" to dictionary 506 so that those forms map to the same class as the word "work." In some examples, the knowledge-base modification module 244 can add past- or future-tense forms of present-tense entries, plural forms of singular entries (or vice versa), or other grammatical variants or spelling variants ("gray" vs. "grey") of terms to the dictionary 506.

In some examples, the classification module 246 is configured to determine a particular word or phrase that is not associated with a stored dictionary 506 of the knowledge base 502 and that is present in one(s) of the plurality of documents 108. For example, the classification module 246 can take as input words or phrases from the phrase-filtering module 236 that are not found in the dictionary 506. In this example, the dictionary 506 includes respective attribute(s) for individual one(s) of the words or phrases in the dictionary 506, in addition to the classes to which those words or phrases map. Some examples of attributes include, but are not limited to, part(s) of speech of word(s) or of word(s) in phrase(s), identification of which of the Justeson-Katz patterns a phrase matches, spatial relationships between words in a phrase, context(s) in which a phrase can occur (e.g., before or after a verb), stems of word(s), e.g., in a phrase (e.g., "run" for "running"), synonyms of word(s), e.g., in a phrase, order of selected words in a phrase, e.g., words considered to be important based on, e.g., RIDF or MI scores, or distances between ones of the selected words.

In some examples, the classification module 246 is configured to determine one or more respective attribute(s) of the particular word or phrase. For example, the classification module 246 can determine parts of speech or other one(s) of the attribute(s) listed above, e.g., using techniques described herein with reference to the phrase-extraction module 234 and the phrase-filtering module 236. The determined attribute(s) of the particular word or phrase can be arranged, e.g., as a "feature vector" expressing values of the attribute(s) in a predetermined order.

In some examples, the classification module 246 is configured to update the dictionary 506, e.g., to associate, in the dictionary 506, the particular word with a particular class of the model based at least in part on the one or more attribute(s) of the particular word or phrase and one or more of the attribute(s) of individual one(s) of the words or phrases in the dictionary 506. For example, the classification module 246 can provide the feature vector to a neural network or other classifier and receive a particular class of the model. The classification module 246 can then update the dictionary 506 to record an association between the particular word or phrase and the particular class of the model. The classification module 246 can also store at least some of the determined attribute(s), e.g., the feature vector, in the dictionary 506 as attribute(s) of the particular word or phrase. In some examples, the classification module 246 can store, as an attribute of the particular word or phrase, an indication that the class was determined automatically rather than being provided by a human domain expert. In some examples, the classification module 246 can provide information about words, phrases, attributes, and mappings to the knowledge base modification module 244. In some of these example, the knowledge base modification module 244 can then make changes to the knowledge base 502.

In some examples, the classifier provides a confidence value or other indication of the confidence of the class determination based on the feature vector. In some of these examples, the classification module 246 is configured to compare the confidence value to a predetermined threshold. If the confidence value is below the predetermined threshold, the classification module 246 can transmit or present an indication of the particular word or phrase, e.g., to a domain expert. The classification module 246 can additionally transmit at least some of the attribute(s) of particular word or phrase, the user text in which the particular word or phrase occurred, or other information that can be helpful to the domain expert in assigning a class to the particular word or phrase. The classification module 246 can then receive, e.g., from the domain expert via a user interface, a class for the particular word or phrase. That class can be a class newly added to the model (ontology 504) for this particular word or phrase, or can be an existing class in the ontology 504.

In some examples, the reporting module 248 can be configured to generate various forms of output that represent the processing by the analysis module 240 or the recommendation module 242. For example, the reporting module 248 can transmit data of or indicating a suggestion 110 or a ranking of the user suggestions 110 to the computing device 516, as discussed above. This can, e.g., facilitate a decision relating to an update of software or hardware identified as an instance of entity class 410 in the document(s) 108.

In some examples, the reporting module 248 can generate various visualizations, e.g., graphical interfaces, that reflect motifs inferred by the analysis module 240. The graphical interfaces can reflect individual user suggestions or trends across multiple suggestions. The reporting module 248 can provide interface options such as menu selections to filter by product name, product model (e.g., WINDOWS 7 versus WINDOWS 10 or GMAIL beta versus GMAIL non-beta), or other fields to identify particular properties of suggestions that are obtained from the documents 108. The reporting module 248 can also implement a queryable application programming interface (API), e.g., a REST, Web Services, or other API, to allow other modules (e.g., third-party software) to access the output.

In some examples, the reporting module 248 can provide a graphical representation of a motif tree showing the motif(s), ontology classes and subclasses, and words or phrases found in one or more document(s) 108. Such a tree can show how the motif(s) were identified. The reporting module 248 can present the motif tree as part of a graphical user interface that allows a user to interact with the motif tree. For example, users can move the mouse cursor over a given node and the immediate parent and sibling nodes can be highlighted. This can be useful, for example, for helping users quickly grasp the significance of relatively complicated motif trees.

In some examples, the reporting module 248 can provide a graphical representation of trends across multiple documents 108, e.g., by showing a "tag cloud" of entities or a view showing icons indicating, e.g., by their size or color, how frequently particular words or phrases, classes, or motifs occur in the analyzed documents 108. Example icons can include circles sized relative to the number of instances of individual motifs extracted from the documents 108. The graphical representation can include or be presented accompanying selectable user options to view analyses of documents 108 at user-specified levels of granularity.

Illustrative Processes

Figure 6:
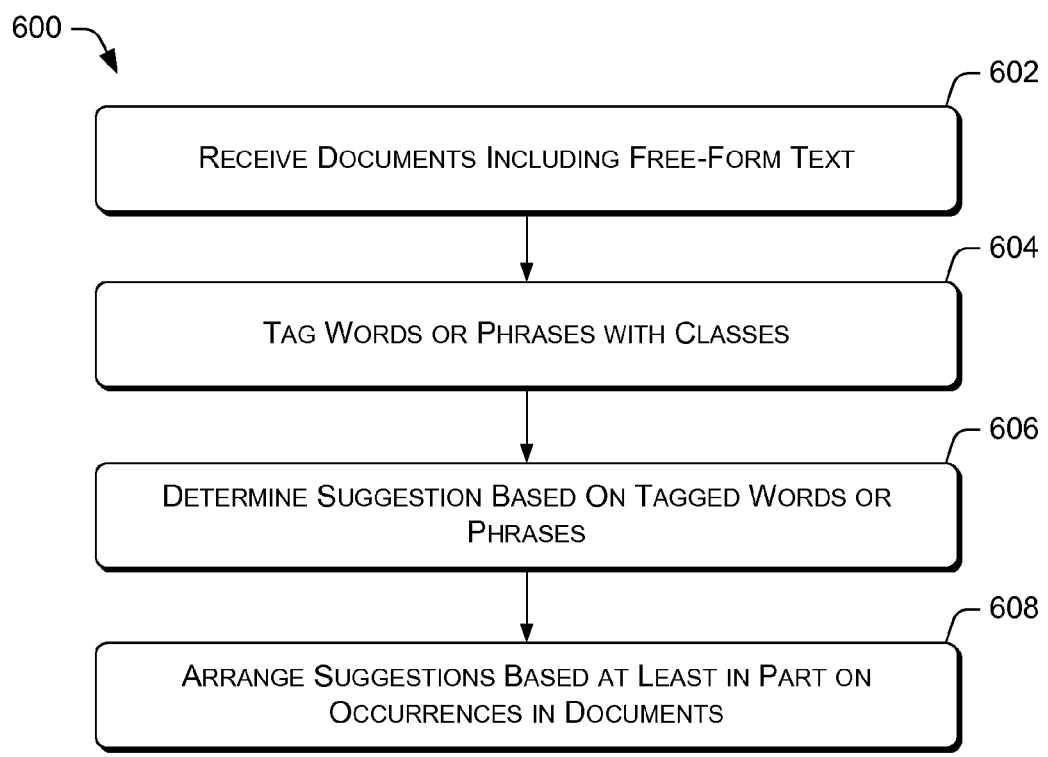
FIG. 6 is a flow diagram that illustrates example processes for determining user suggestions in documents.
Figure 7:
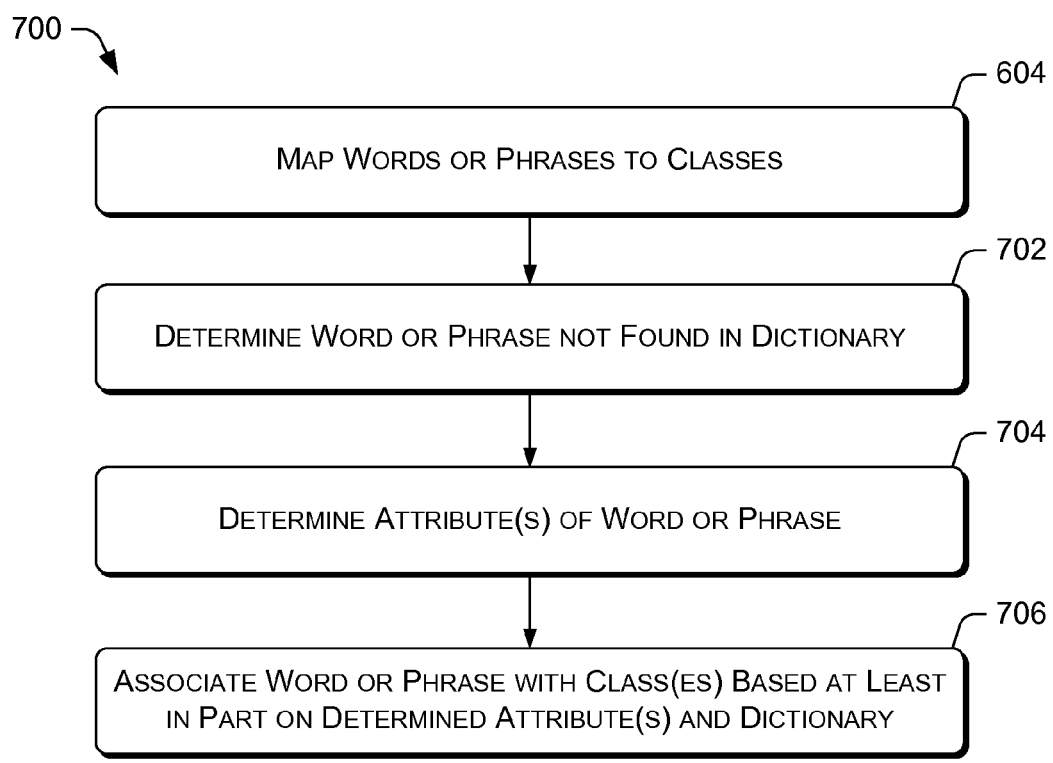
FIG. 7 is a flow diagram that illustrates example processes for automatically updating a dictionary.

FIG. 6 is a flow diagram that illustrates an example process 600 for determining user-suggestion data using a computing device, e.g., computing device 102, FIG. 1, or 200, FIG. 2. Example functions shown in FIG. 5 and other flow diagrams and example processes herein can be implemented on or otherwise embodied in one or more computing devices 102 or 104, e.g., using software running on such devices. For the sake of illustration, the example process 600 is described below with reference to processing unit 218 and other components of computing device 200, FIG. 2, and to ontologies, dataflows and operations discussed above with reference to FIGS. 4 and 5, that can carry out or participate in the steps of the example method. However, other processing units such as processing unit 116 and/or other components of computing devices 102 or 104 can carry out steps of described example processes such as process 600. Similarly, example methods shown in FIGS. 6 and 7 are also not limited to being carried out by any particularly-identified components.

The order in which the operations are described in each example flow diagram or process is not intended to be construed as a limitation, and any number of the described operations can be combined in any order and/or in parallel to implement each process. Moreover, the operations in each of FIGS. 6 and 7 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

At block 602, a computing device 102 can receive a plurality of documents, individual ones of the plurality of documents including free-form text. The free-form text can include, e.g., feedback from a user in a natural language.

At block 604, the computing device 102 can tag, for individual ones of the plurality of documents, individual words or phrases of the free-form text of the respective document with individual classes of a set of classes, at least one of the individual classes of the set of classes being a suggestion-indicator class 416. This can be done, e.g., as described above with reference to the phrase-extraction module 234, the phrase-filtering module 236, and the mapping module 238, and can be performed with reference, e.g., to dictionary 506. For example, the tagging can be based at least in part on a stored dictionary 506 mapping words or phrases to one(s) of the set of classes.

At block 606, the computing device 102 can determine, for individual ones of the plurality of documents, a suggestion (or respective suggestions), e.g., regarding an update to an item, or including a suggested action to be taken to improve an entity, the entity being associated with the item. The suggestion(s) can be determined based at least in part on the tagged words or phrases for the respective document, e.g., as described above with reference to the analysis module 240. For example, the computing device 102 can determine, for individual ones of the plurality of documents, that the tagged words or phrases of the respective document match a stored grammar pattern for a suggestion motif. The grammar pattern for the suggestion motif can define a first class of the set of classes preceding a second class of the set of classes, the first class or the second class comprising the suggestion-indicator class 416 for words or phrases that represent the presence of a suggestion. The set of classes can include at least one of the classes discussed above with reference to FIG. 4.

At block 608, the computing device 102 can arrange the suggestions in an order based at least in part on occurrences of individual ones of the suggestions for the plurality of documents, or based at least in part on other ranking criteria described herein. This can be done, e.g., as described above with reference to the recommendation module 242.

In some examples, block 608 can include or be followed by a block (not shown) of outputting the arranged, e.g., ranked suggestions. This can be done, e.g., as discussed above with reference to the reporting module 248.

In some examples, at block 606, the computing device 102 can additionally or alternatively determine, for individual ones of the plurality of documents, a question (or respective questions), regarding, e.g., an entity, action, or condition. In some examples, at block 608, the computing device 102 can arrange the questions in an order based at least in part on occurrences of individual ones of the questions for the plurality of documents, or based at least in part on other ranking criteria described herein. This can be done, e.g., as described above with reference to the recommendation module 242.

FIG. 7 is a flow diagram that illustrates an example process 700 for updating a dictionary using a computing device, e.g., computing device 102, FIG. 1, or 200, FIG. 2. Process 700 can be used, e.g., with blocks of FIG. 6 including block 604 tagging words or phrases based at least in part on a stored dictionary (dictionary 506) mapping words or phrases to one(s) of the set of classes.

At block 702, the computing device 102 determines a particular word or phrase in at least one of the plurality of documents that is not associated with the dictionary, e.g., dictionary 506. This can be done, e.g., as discussed above with reference to the classification module 246. The dictionary includes respective attribute(s) for individual one(s) of the words or phrases in the dictionary. In some examples, at block 702, the particular word or phrase can be determined based at least in part on candidates determined based at least in part on the input free-form text. Candidates can be determined, e.g., using filtering as described above with reference to the phrase extraction module 234 and the phrase filtering module 236, FIG. 5.

At block 704, the computing device 102 determines one or more respective attribute(s) of the particular word or phrase. The computing device 102 can determine, e.g., a feature vector. This can be done, e.g., as discussed above with reference to the classification module 246.

At block 706, the computing device 102 updates the dictionary to include an association between the particular word or phrase and particular one(s) of the set of classes based at least in part on the one or more attribute(s) of the particular word or phrase and one or more of the attribute(s) of individual one(s) of the words or phrases in the dictionary. This can be done, e.g., as discussed above with reference to the classification module 246. For example, the feature vector can be provided to a classifier and the resulting class stored in the dictionary.

Example Clauses

A: A system comprising: one or more processors; memory communicatively coupled to the one or more processors; an interface communicatively coupled to the one or more processors and configured to receive a plurality of documents, individual ones of the plurality of documents including free-form user text; a mapping module stored in the memory and executable by the one or more processors to map, for individual ones of the plurality of documents, individual words or phrases of the free-form user text of the respective document to individual classes of a model, the model including, e.g., a suggestion-indicator or modal-indicator class, or other class(es); an analysis module stored in the memory and executable by the one or more processors to determine, for individual ones of the plurality of documents, corresponding actionable items based at least in part on a comparison of the mapped words or phrases for the respective document to a selected grammar pattern; and a recommendation module stored in the memory and executable by the one or more processors to analyze individual ones of the actionable items to generate a recommendation; and a reporting module configured to present or transmit an indication of the recommendation.

B: A system as paragraph A recites, wherein at least some of the actionable items include user suggestions regarding software or hardware.

C: A system as paragraph A or B recites, wherein the recommendation module is further configured to generate the recommendation regarding an update to the software or hardware.

D: A system as any of paragraphs A-C recites, wherein the reporting module is configured to send the recommendation to a computing device of a user that is associated with management of the software or hardware.

E: A system as any of paragraphs A-D recites, wherein the analysis module is further executable by the one or more processors to identify set(s) of the mapped words or phrases that correspond to the selected grammar pattern, the selected grammar pattern being associated with a motif representing a user suggestion and the selected grammar pattern defining a first class of the model preceding a second class of the model.

F: A system as any of paragraphs A-E recites, wherein individual classes of the model include at least one of a suggestion-indicator class or a modal-indicator class for words or phrases that represent the presence of a suggestion, an entity class for words or phrases that represent an entity, an action class for words or phrases that represent a behavior that is taken on an entity, a certainty class for words or phrases that represent the confidence of the user regarding an entity or condition represented in the free-form user text, an emotion class for words or phrases that represent feelings or beliefs of the user writing the free-form user text, or a negation class for words or phrases that negate one or more other words or phrases.

G: A system as any of paragraphs A-F recites, wherein the recommendation includes a ranking of the actionable items, a first actionable item that occurs more frequently in the plurality of documents than a second actionable item being ranked higher than the second actionable item.

H: A system as paragraph G recites, wherein the first actionable item includes a first user suggestion and the second actionable item includes a second user suggestion.

I: A system as any of paragraphs A-H recites, further comprising: a knowledge-base modification module stored in the memory and executable by the one or more processors to: determine a first word or phrase in the free-form user text; determine that the first word or phrase has a threshold level of similarity to a second, different word or phrase represented in the dictionary of the knowledge base; and replace the second word or phrase in the dictionary of the knowledge base with the first word or phrase.

J: A system as any of paragraphs A-I recites, further comprising: a knowledge-base modification module stored in the memory and executable by the one or more processors to add, for individual words mapped to at least one class of the model, at least one of one or more synonyms of the respective word or one or more lexical or morphological forms of the respective word to a knowledge base dictionary associated with the model.

K: A system as any of paragraphs A-J recites, further comprising: a classification module stored in the memory and executable by the one or more processors to automatically: determine a particular word or phrase that is not associated with a dictionary of the knowledge base and that is present in one(s) of the plurality of documents, wherein the dictionary includes respective attribute(s) for individual one(s) of the words or phrases in the dictionary; determine one or more respective attribute(s) of the particular word or phrase; and associate, in the dictionary, the particular word with a particular class of the model based at least in part on the one or more attribute(s) of the particular word or phrase and one or more of the attribute(s) of individual one(s) of the words or phrases in the dictionary.

L: A system as paragraph K recites, wherein the classification module is configured to determine a confidence value or other indication of the confidence of the class determination based at least in part on the feature vector.

M: A system as paragraph L recites, wherein the classification module is configured to: compare the determined confidence value to a predetermined threshold; and in response to the determined confidence value being below the predetermined threshold, transmit or present an indication of the particular word or phrase, e.g., via a user interface.

N: A system as paragraph M recites, wherein the classification module is further configured to transmit with or accompanying the indication at least some of the attribute(s) of particular word or phrase or the user text in which the particular word or phrase occurred.

O: A system as paragraph M or N recites, wherein the classification module is further configured to receive a class for the particular word or phrase and associate the received class with the particular word or phrase in the dictionary.

P: A method comprising: receiving, by a computing device, a plurality of documents, individual ones of the plurality of documents including free-form text; tagging, by the computing device and for individual ones of the plurality of documents, individual words or phrases of the free-form text of the respective document with individual classes of a set of classes, at least one of the individual classes of the set of classes including a suggestion-indicator or a modal-indicator class; determining, by the computing device and for individual ones of the plurality of documents, an actionable item, e.g., a suggestion, based at least in part on the tagged words or phrases for the respective document; and arranging, by the computing device, the actionable items, e.g., suggestions, in an order based at least in part on occurrences of individual ones of the actionable items, e.g., suggestions, for the plurality of documents.

Q: A method as paragraph P recites, wherein at least one of the actionable item(s) comprises a suggestion regarding an update to an item.

R: A method as paragraph P or Q recites, wherein the free-form text comprises feedback from a user in a natural language.

S: A method as any of paragraphs P-R recites, wherein the determining comprises: determining, for individual ones of the plurality of documents, that the tagged words or phrases of the respective document match a stored grammar pattern for a suggestion motif, wherein the grammar pattern for the suggestion motif defines a first class of the set of classes preceding a second class of the set of classes, the first class or the second class comprising a suggestion-indicator class or a modal-indicator class for words or phrases that represent the presence of a suggestion.

T: A method as paragraph S recites, wherein the determining comprises determining, for an individual one of the plurality of documents, the suggestion including a suggested action to be taken to improve an entity, the entity being associated with the item.

U: A method as any of paragraphs P-T recites, wherein the set of classes further includes at least one of an entity class for words or phrases that represent an entity, an action class for words or phrases that represent a behavior that is taken on an entity, a certainty class for words or phrases that represent the confidence of the user regarding an entity or condition represented in the free-form text, an emotion class for words or phrases that represent feelings or beliefs of the user writing the free-form text, or a negation class for words or phrases that negate one or more other words or phrases.

V: A method as any of paragraphs P-U recites, wherein the tagging is based at least in part on a stored dictionary mapping words or phrases to one(s) of the set of classes and the method further comprises: determining a particular word or phrase in at least one of the plurality of documents that is not associated with the dictionary, wherein the dictionary includes respective attribute(s) for individual one(s) of the words or phrases in the dictionary; determining one or more respective attribute(s) of the particular word or phrase; and updating the dictionary to include an association between the particular word or phrase and particular one(s) of the set of classes based at least in part on the one or more attribute(s) of the particular word or phrase and one or more of the attribute(s) of individual one(s) of the words or phrases in the dictionary.

W: A method as paragraph V recites, further including determining a confidence value or other indication of the confidence of the class determination based at least in part on the feature vector.

X: A method as paragraph W recites, further including: comparing the determined confidence value to a predetermined threshold; and in response to the determined confidence value being below the predetermined threshold, transmitting or presenting an indication of the particular word or phrase, e.g., via a user interface.

Y: A method as paragraph X recites, further including transmitting with or accompanying the indication at least some of the attribute(s) of particular word or phrase or the user text in which the particular word or phrase occurred.

Z: A method as paragraph X or Y recites, further including receiving a class for the particular word or phrase and associating the received class with the particular word or phrase in the dictionary.

AA: One or more computer-readable media storing computer-executable instructions that, when executed by the one or more processors, cause the one or more processors to perform acts comprising: mapping, for individual ones of a plurality of documents including free-form user text, individual words or phrases of the free-form user text of the respective document to individual classes of an ontology; determining, for individual ones of the plurality of documents, actionable item(s) regarding an update to a software or hardware element based at least in part on individual one(s) of the mapped words or phrases for the respective document that match a selected grammar pattern; ranking individual ones of the actionable items; and outputting the ranking of the actionable items.

AB: One or more computer-readable media as paragraph AA recites, wherein the actionable item(s) include one or more user suggestion(s).

AC: One or more computer-readable media as paragraph AA or AB recites, wherein the determining comprises: determining, for individual ones of the plurality of documents, that the mapped words or phrases of the respective document match the selected grammar pattern for a suggestion motif, wherein the selected grammar pattern for the suggestion motif defines a first class of the ontology preceding a second class of the ontology, the first class or the second class comprising a suggestion-indicator class or a modal-indicator class for words or phrases that represent presence of a suggestion in the free-form text.

AD: One or more computer-readable media as any of paragraphs AA-AC recites, wherein the determining comprises determining, for individual ones of the plurality of documents, a suggested action to be taken to improve an entity.

AE: One or more computer-readable media as any of paragraphs AA-AD recites, wherein the acts further comprise: determine a first word or phrase in the free-form user text; determine that the first word or phrase has a threshold level of similarity to a second word or phrase represented in a dictionary of the knowledge base; and replace the second word or phrase in the dictionary of the knowledge base with the first word or phrase.

AF: One or more computer-readable media as any of paragraphs AA-AE recites, wherein the acts further comprise: adding, for individual words within at least one class of the ontology, at least one of one or more synonyms of the respective word or one or more lexical or morphological forms of the respective word to a knowledge base dictionary associated with the ontology.

AG: One or more computer-readable media as any of paragraphs AA-AF recites, wherein the acts further comprise: determining a particular word or phrase in at least one of the plurality of documents that is not associated with a stored dictionary, wherein the dictionary includes respective attribute(s) for individual one(s) of the words or phrases in the dictionary; determining one or more respective attribute(s) of the particular word or phrase; and updating the dictionary to include an association between the particular word or phrase and particular one(s) of the set of classes based at least in part on the one or more attribute(s) of the particular word or phrase and one or more of the attribute(s) of individual one(s) of the words or phrases in the dictionary.

AH: A computer-readable medium, e.g., a computer storage medium, having thereon computer-executable instructions, the computer-executable instructions upon execution configuring a computer to perform operations as any of paragraphs P-Z recites.

AI: A device comprising: a processor; and a computer-readable medium, e.g., a computer storage medium, having thereon computer-executable instructions, the computer-executable instructions upon execution by the processor configuring the device to perform operations as any of paragraphs P-Z describe.

AJ: A system comprising: means for processing; and means for storing having thereon computer-executable instructions, the computer-executable instructions including means to configure the device to carry out a method as any of paragraphs P-Z describe.

AK: A system comprising: means for receiving, by a computing device, a plurality of documents, individual ones of the plurality of documents including free-form text; means for tagging, by the computing device and for individual ones of the plurality of documents, individual words or phrases of the free-form text of the respective document with individual classes of a set of classes, at least one of the individual classes of the set of classes including a suggestion-indicator or a modal-indicator class; means for determining, by the computing device and for individual ones of the plurality of documents, a suggestion regarding an update to an item based at least in part on the tagged words or phrases for the respective document; and means for arranging, by the computing device, the suggestions in an order based at least in part on occurrences of individual ones of the suggestions for the plurality of documents.

AL: A system as paragraph AK recites, wherein the free-form text comprises feedback from a user in a natural language.

AM: A system as paragraph AK or AL recites, wherein the means for determining comprises: means for determining, for individual ones of the plurality of documents, that the tagged words or phrases of the respective document match a stored grammar pattern for a suggestion motif, wherein the grammar pattern for the suggestion motif defines a first class of the set of classes preceding a second class of the set of classes, the first class or the second class comprising the suggestion-indicator class or the modal-indicator class for words or phrases that represent the presence of a suggestion.

AN: A system as paragraph AM recites, wherein the means for determining comprises means for determining, for an individual one of the plurality of documents, the suggestion including a suggested action to be taken to improve an entity, the entity being associated with the item.

AO: A system as any of paragraphs AK-AN recites, wherein the set of classes further includes at least one of an entity class for words or phrases that represent an entity, an action class for words or phrases that represent a behavior that is taken on an entity, a certainty class for words or phrases that represent the confidence of the user regarding an entity or condition represented in the free-form text, an emotion class for words or phrases that represent feelings or beliefs of the user writing the free-form text, or a negation class for words or phrases that negate one or more other words or phrases.

AP: A system as any of paragraphs AK-AO recites, wherein the means for tagging operates based at least in part on a stored dictionary mapping words or phrases to one(s) of the set of classes and the system further comprises: means for determining a particular word or phrase in at least one of the plurality of documents that is not associated with the dictionary, wherein the dictionary includes respective attribute(s) for individual one(s) of the words or phrases in the dictionary; means for determining one or more respective attribute(s) of the particular word or phrase; and means for updating the dictionary to include an association between the particular word or phrase and particular one(s) of the set of classes based at least in part on the one or more attribute(s) of the particular word or phrase and one or more of the attribute(s) of individual one(s) of the words or phrases in the dictionary.

AQ: A system as paragraph AP recites, further including means for determining a confidence value or other indication of the confidence of the class determination based at least in part on the feature vector.

AR: A system as paragraph AQ recites, further including: means for comparing the determined confidence value to a predetermined threshold; and means for, in response to the determined confidence value being below the predetermined threshold, transmitting or presenting an indication of the particular word or phrase, e.g., via a user interface.

AS: A system as paragraph AR recites, further including means for transmitting with or accompanying the indication at least some of the attribute(s) of particular word or phrase or the user text in which the particular word or phrase occurred.

AT: A system as paragraph AR or AS recites, further including means for receiving a class for the particular word or phrase and associating the received class with the particular word or phrase in the dictionary.

CONCLUSION

Motif-inference techniques described herein can reduce the amount of time required to filter documents for user suggestions and can permit users to provide feedback in natural language, which is faster and easier for the users than completing structured feedback forms. Various examples permit inferring trends across multiple documents. The motifs and trends can be output via various interfaces, e.g., visualizations, programming interfaces, etc. The outputs can be used to enhance the ability of engineers or managers to readily solve user problems. Newly-identified phrases in new or incoming documents can automatically be added to a dictionary over time to iteratively learn the new phrases for use as future documents arrive for processing. This automated updating of the dictionary can permit inferring suggestions, e.g., regarding newly-released or beta products, without requiring a domain expert to manually classify words.

Although the techniques have been described in language particular to structural features or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing devices 102, 104, or 200 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

The disclosure includes combinations of the examples described herein. References to a particular "example" and the like refer to features that are present in at least one example or configuration of what is within the scope of the disclosed subject matter. Separate references to "an example" or "particular examples" or the like do not necessarily refer to the same example or examples; however, such examples are not mutually exclusive, unless specifically indicated. The use of singular or plural in referring to "example," "examples," "method," "methods" and the like is not limiting.

Any routine descriptions, elements or blocks in the flow diagrams described herein and/or depicted in the attached figures should be understood as potentially representing modules, segments, or portions of code that include one or more executable instructions for implementing particular logical functions or elements in the routine. Alternative implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

The invention claimed is:

1. A system comprising:
   one or more processors;
   memory communicatively coupled to the one or more processors;
   an interface communicatively coupled to the one or more processors and configured to receive a plurality of documents, individual ones of the plurality of documents including free-form user text;
   a mapping module stored in the memory and executable by the one or more processors to map, for individual ones of the plurality of documents, individual words or phrases of the free-form user text of the respective document to individual classes of a model;
   an analysis module stored in the memory and executable by the one or more processors to determine, for individual ones of the plurality of documents, corresponding actionable items based at least in part on a comparison of the mapped words or phrases for the respective document to a selected grammar pattern;
   a recommendation module stored in the memory and executable by the one or more processors to analyze individual ones of the actionable items to generate a recommendation;
   a reporting module stored in the memory and executable by the one or more processors to present or transmit an indication of the recommendation; and
   a classification module stored in the memory and executable by the one or more processors to automatically:
      determine a particular word or phrase that is not associated with a dictionary of a knowledge base and that is present in one of the plurality of documents, the dictionary includes one or more respective attributes for individual ones of the words or phrases in the dictionary;
      determine one or more respective attributes of the particular word or phrase; and
      associate, in the dictionary, the particular word with a particular class of the model based at least in part on the one or more respective attributes of the particular word or phrase and one or more of the one or more respective attributes for individual ones of the words or phrases in the dictionary.

2. A system as claim 1 recites, wherein the reporting module is configured to send the recommendation to a computing device of a user that is associated with management of the software or hardware.

3. A system as claim 1 recites, wherein the analysis module is further executable by the one or more processors to identify one or more sets of the mapped words or phrases that correspond to the selected grammar pattern, the selected grammar pattern being associated with a motif representing a user suggestion and the selected grammar pattern defining a first class of the model preceding a second class of the model.

4. A system as claim 1 recites, wherein individual classes of the model include at least one of a suggestion-indicator class or a modal-indicator class for words or phrases that represent the presence of a suggestion, an entity class for words or phrases that represent an entity, an action class for words or phrases that represent a behavior that is taken on an entity, a certainty class for words or phrases that represent the confidence of the user regarding an entity or condition represented in the free-form user text, an emotion class for words or phrases that represent feelings or beliefs of the user writing the free-form user text, or a negation class for words or phrases that negate one or more other words or phrases.

5. A system as claim 1 recites, wherein the recommendation includes a ranking of the actionable items, a first actionable item that occurs more frequently in the plurality of documents than a second actionable item being ranked higher than the second actionable item.

6. A system as claim 1 recites, further comprising:
   a knowledge-base modification module stored in the memory and executable by the one or more processors to:

determine a first word or phrase in the free-form user text;
determine that the first word or phrase has a threshold level of similarity to a second, different word or phrase represented in a dictionary of a knowledge base; and
replace the second word or phrase in the dictionary of the knowledge base with the first word or phrase.

7. A system as claim 1 recites, further comprising:
a knowledge-base modification module stored in the memory and executable by the one or more processors to add, for individual words mapped to at least one class of the model, at least one of one or more synonyms of the respective word or one or more lexical or morphological forms of the respective word to a dictionary of a knowledge base, the dictionary associated with the model.

8. A method comprising:
receiving, by a computing device, a plurality of documents, individual ones of the plurality of documents including free-form text;
tagging, by the computing device and for individual ones of the plurality of documents, individual words or phrases of the free-form text of the respective document with individual classes of a set of classes, the tagging being based at least in part on a stored dictionary mapping words and phrases to ones of the set of classes;
determining, by the computing device and for individual ones of the plurality of documents, an actionable item based at least in part on the tagged words or phrases for the respective document;
arranging, by the computing device, the actionable items in an order based at least in part on occurrences of individual ones of the actionable items for the plurality of documents;
determining a particular word or phrase in at least one of the plurality of documents that is not associated with the dictionary, the dictionary includes respective attributes for individual ones of the words or phrases in the dictionary;
determining one or more respective attributes of the particular word or phrase; and
updating the dictionary to include an association between the particular word or phrase and particular ones of the set of classes based at least in part on the one or more attributes of the particular word or phrase and one or more of the attributes of individual ones of the words or phrases in the dictionary.

9. A method as claim 8 recites, wherein the free-form text comprises feedback from a user in a natural language.

10. A method as claim 8 recites, wherein the determining comprises:
determining, for individual ones of the plurality of documents, that the tagged words or phrases of the respective document match a stored grammar pattern for a suggestion motif, wherein the grammar pattern for the suggestion motif defines a first class of the set of classes preceding a second class of the set of classes, the first class or the second class comprising a suggestion-indicator class or a modal-indicator class for words or phrases that represent the presence of a suggestion.

11. A method as claim 8 recites, wherein the determining comprises determining, for an individual one of the plurality of documents, the actionable item including a suggested action to be taken to improve an entity, the entity being associated with the item.

12. A method as claim 8 recites, wherein the set of classes further includes at least one of an entity class for words or phrases that represent an entity, an action class for words or phrases that represent a behavior that is taken on an entity, a certainty class for words or phrases that represent the confidence of the user regarding an entity or condition represented in the free-form text, an emotion class for words or phrases that represent feelings or beliefs of the user writing the free-form text, or a negation class for words or phrases that negate one or more other words or phrases.

13. One or more non-transitory computer-readable media storing computer-executable instructions that, when executed by the one or more processors, cause the one or more processors to perform operations comprising:
mapping, for individual ones of a plurality of documents including free-form user text, individual words or phrases of the free-form user text of the respective document to individual classes of an ontology;
determining a particular word or phrase in at least one of the plurality of documents that is not associated with a stored dictionary, the dictionary including respective attributes for individual ones of the words or phrases in the dictionary;
determining one or more respective attributes of the particular word or phrase; and
updating the dictionary to include an association between the particular word or phrase and particular ones of a set of classes based at least in part on the one or more attributes of the particular word or phrase and one or more of the attributes of individual ones of the words or phrases in the dictionary;
determining, for individual ones of the plurality of documents, one or more actionable items regarding an update to a software or hardware element based at least in part on individual ones of the mapped words or phrases for the respective document that match a selected grammar pattern;
ranking individual ones of the actionable items; and
outputting the ranking of the actionable items.

14. One or more non-transitory computer-readable media as claim 13 recites, wherein the determining comprises:
determining, for individual ones of the plurality of documents, that the mapped words or phrases of the respective document match the selected grammar pattern for a suggestion motif,
wherein the selected grammar pattern for the suggestion motif defines a first class of the ontology preceding a second class of the ontology, the first class or the second class comprising a suggestion-indicator class or a modal-indicator class for words or phrases that represent presence of a suggestion in the free-form text.

15. One or more non-transitory computer-readable media as claim 13 recites, wherein the determining comprises determining, for individual ones of the plurality of documents, a suggested action to be taken to improve an entity.

16. One or more non-transitory computer-readable media as claim 13 recites, wherein the operations further comprise:
determining a first word or phrase in the free-form user text;
determining that the first word or phrase has a threshold level of similarity to a second word or phrase represented in a dictionary of a knowledge base; and
replacing the second word or phrase in the dictionary of the knowledge base with the first word or phrase.

17. One or more non-transitory computer-readable media as claim 13 recites, wherein the operations further comprise:

adding, for individual words within at least one class of the ontology, at least one of one or more synonyms of the respective word or one or more lexical or morphological forms of the respective word to a dictionary associated with the ontology.

* * * * *